United States Patent
Nonaka et al.

(10) Patent No.: US 8,292,727 B2
(45) Date of Patent: Oct. 23, 2012

(54) GAME APPARATUS AND STORAGE MEDIUM HAVING STORED THEREON GAME PROGRAM

(75) Inventors: Toyokazu Nonaka, Kyoto (JP); Nobuo Matsumiya, Kyoto (JP); Yuki Hatakeyama, Yokohama (JP)

(73) Assignee: Nintendo Co., Ltd., Kyoto (JP)

(*) Notice: Subject to any disclaimer, the term of this patent is extended or adjusted under 35 U.S.C. 154(b) by 492 days.

(21) Appl. No.: 12/556,007

(22) Filed: Sep. 9, 2009

(65) Prior Publication Data
US 2010/0323783 A1   Dec. 23, 2010

(30) Foreign Application Priority Data
Jun. 23, 2009   (JP) ................................. 2009-148399

(51) Int. Cl.
*A63F 9/24* (2006.01)
(52) U.S. Cl. .......................................... 463/23; 463/43
(58) Field of Classification Search .............. 463/23, 463/43, 30, 31
See application file for complete search history.

(56) References Cited

U.S. PATENT DOCUMENTS

| | | | | |
|---|---|---|---|---|
| 7,601,066 | B1* | 10/2009 | Masuyama et al. | 463/38 |
| 7,782,298 | B2* | 8/2010 | Smith et al. | 345/157 |
| 2006/0046848 | A1* | 3/2006 | Abe et al. | 463/37 |
| 2006/0128468 | A1* | 6/2006 | Yoshikawa et al. | 463/36 |
| 2006/0287084 | A1* | 12/2006 | Mao et al. | 463/37 |
| 2007/0050597 | A1* | 3/2007 | Ikeda | 712/1 |
| 2007/0191112 | A1* | 8/2007 | Ohta | 463/43 |
| 2008/0015017 | A1* | 1/2008 | Ashida et al. | 463/37 |
| 2008/0076567 | A1* | 3/2008 | Dohta | 463/37 |
| 2008/0132339 | A1* | 6/2008 | Taira | 463/43 |
| 2009/0017911 | A1* | 1/2009 | Miyazaki | 463/37 |
| 2009/0017912 | A1* | 1/2009 | Miyazaki | 463/37 |
| 2009/0183567 | A1* | 7/2009 | Fukushima et al. | 73/504.02 |
| 2009/0326847 | A1* | 12/2009 | Ohta | 702/93 |
| 2010/0214214 | A1* | 8/2010 | Corson et al. | 345/158 |
| 2010/0248824 | A1* | 9/2010 | Suzuki et al. | 463/30 |

FOREIGN PATENT DOCUMENTS

| | | | |
|---|---|---|---|
| EP | 1947549 A1 | * | 7/2008 |
| JP | 2007-295990 | | 11/2007 |

* cited by examiner

*Primary Examiner* — William Brewster
*Assistant Examiner* — Jason Skaarup
(74) *Attorney, Agent, or Firm* — Nixon & Vanderhye P.C.

(57) ABSTRACT

Whether or not an angular velocity detected by an angular velocity sensor is used for a game process is determined, and a difficulty level of a game to be subjected to a game process is set so as to vary depending on whether the angular velocity is determined to be used or the angular velocity is determined not to be used. When the angular velocity is determined not to be used, a process of specifying a motion direction of an input device is performed by using acceleration detected by an acceleration sensor, whereas when the angular velocity is determined to be used, at least a part of the process of specifying the motion of the input device is performed by using the angular velocity detected by the angular velocity sensor. Accordingly, based on the specified motion direction, the game process is performed while the set difficulty level is applied.

22 Claims, 17 Drawing Sheets a : b = Ro : Rt a : b = Ro : Rt

GAME APPARATUS AND STORAGE MEDIUM HAVING STORED THEREON GAME PROGRAM

CROSS REFERENCE TO RELATED APPLICATION

The disclosure of Japanese Patent Application No. 2009-148399, filed Jun. 23, 2009, is incorporated herein by reference.

BACKGROUND AND SUMMARY

1. Technical Field

The technology presented herein relates to a game apparatus and a storage medium having stored thereon a game program, and more particularly to a game apparatus and a storage medium having stored thereon a game program which are capable of performing a game process based on a motion applied to an input device.

2. Description of the Background Art

For example, in Japanese Laid-Open Patent Publication No. 2007-295990 (hereinafter referred to as patent document 1), disclosed is a technique of calculating a motion direction of an input device such as a controller in accordance with acceleration data outputted by an acceleration sensor mounted in the input device. A motion direction calculation device disclosed in the above-described patent document 1 identifies a direction in which the input device is being swung by using transition in acceleration data obtained during a predetermined period of time.

In the case of an operation performed by swinging the input device, even if motion of the input operation can be recognized highly accurately, it is difficult for a user to swing the input device in an appropriate direction. For example, suppose a case where an operation is performed to cause a predetermined object in a virtual world to move in accordance with a direction in which the input device is swung. In this case, the direction in which the input device is swung needs to be recognized in accordance with an attitude of the input device in an actual space. That is, when the attitude of the input device in the actual space is recognized erroneously, the error also affects the recognition accuracy of recognizing a direction in which the input device is swung. The recognition accuracy of recognizing the attitude of the input device in the actual space generally varies depending on recognition modes. Therefore, an operational difficulty level changes depending on the recognition mode to be used.

SUMMARY

Therefore, a feature of the example embodiments presented herein is to provide a game apparatus and a storage medium having stored thereon a game program which are capable of appropriately setting an operational difficulty level in accordance with a mode for recognizing a motion of an input device in a game which is played based on an operation of moving the input device.

The present embodiment has the following features to attain the object feature mentioned above.

A first aspect of the present embodiment is a game apparatus for performing a game process in accordance with a motion applied to an input device provided with at least one of an acceleration sensor and an angular velocity sensor. The game apparatus includes determination means, difficulty level setting means, motion direction specifying means, and game processing means. The determination means determines whether or not an angular velocity detected by the angular velocity sensor is to be used for the game process. The difficulty level setting means sets a difficulty level of a game to be subjected to the game process so as to vary depending on whether the determination means determines to use the angular velocity or the determination means determines not to use the angular velocity. The motion direction specifying means performs a process of specifying a motion direction of the input device by using acceleration detected by the acceleration sensor when the determination means has determined not to use the angular velocity, and performs at least a part of the process of specifying the motion direction of the input device by using the angular velocity detected by the angular velocity sensor when the determination means has determined to use the angular velocity. The game processing means performs the game process in accordance with the motion direction specified by the motion direction specifying means while the difficulty level set by the difficulty level setting means is applied.

The variation of the difficulty level described above is obtained by the following difficulty level settings, for example. However, the following level settings are merely examples, in any way, and will not limit the scope of the present invention. As a first example, a game process is set at various difficulty levels depending on whether a game process is performed by correcting the motion direction of the input device or the game process is performed without correcting the motion direction. As a second example, an amount (level) of correcting the motion direction of the input device is set to vary and the game process is performed, whereby the game process is set at various difficulty levels. As a third example, a frequency of correcting the motion direction of the input device is set to vary and the game process is performed, whereby the game process is set at various difficulty levels. As a fourth example, a range in which the motion direction of the input device can be reflected is set to vary, and the game process is performed, whereby the game process is set at various difficulty levels. As a fifth example, a score obtained during a game is set to vary, and the game process is performed, whereby the game process is set at various difficulty levels. As a sixth example, a clear condition (bearing force of an enemy character or the like) set for clearing a game stage is set to vary, and the game process is performed, whereby the game process is set at various difficulty levels.

Accordingly, in comparison between the case where the game process is performed by using the angular velocity detected by the angular velocity sensor provided to the input device and the case where the game process is performed without using the angular velocity, the difficulty level of the game based on both of the cases varies. In this manner, the difficulty level of the game is changed depending on a mode for recognizing the motion of the input device operated by a player, whereby an operational difficulty level for the player can be adjusted appropriately.

The game processing means may set a moving direction of a player object in a virtual game world in accordance with the motion direction specified by the motion direction specifying means, and may correct the moving direction in accordance with the difficulty level, so as to cause the player object to move in the virtual game world. In this case, the difficulty level setting means may set a level of correction of the moving direction as the difficulty level.

Accordingly, the level of correction of the moving direction is changed depending on the mode for recognizing the motion of the input device operated by a player, whereby the game process can be performed at various difficulty levels.

The difficulty level setting means may set the level of correction relatively higher when the determination means has determined not to use the angular velocity than when the determination means has determined to use the angular velocity.

Accordingly, the level of correction of the moving direction is set relatively higher when the motion of the input device is recognized without using the angular velocity, whereby the game process can be performed while the difficulty level is set relatively low.

Further, the difficulty level setting means sets the level of correction to 0 so as not to correct the moving direction when the determination means has determined to use the angular velocity.

Accordingly, the moving direction is not corrected when the motion of the input device is to be recognized in accordance with the angular velocity, whereby the game process can be performed while the difficulty level is set relatively high.

Further, the game processing means may set the moving direction to a direction, in the virtual game world, corresponding to the motion direction specified by the motion direction specifying means, and may correct the moving direction when the moving direction points to and falls within a predetermined range. In this case, the difficulty level setting means may set the level of correction by changing the predetermined range.

Accordingly, in accordance with the mode for recognizing the motion of the input device operated by a player, a destination range of the moving direction to be corrected is changed, whereby the game process can be performed at various difficulty levels.

Further, the game processing means may set the moving direction to a direction, in the virtual game world, corresponding to the motion direction specified by the motion direction specifying means, and may correct the moving direction such that the moving direction points to and falls within a predetermined range. In this case, the difficulty level setting means may set the level of correction by changing the predetermined range.

Accordingly, a range of moving direction having been corrected is changed depending on the mode for recognizing the motion of the input device operated by a player, whereby the game process can be performed at various difficulty levels.

Further, the angular velocity sensor is detachably connected to the input device. In this case, the game apparatus may further include connection detection means. The connection detection means detects whether or not the angular velocity sensor is connected to the input device. The determination means may determine to use the angular velocity detected by the angular velocity sensor for the game process when the connection detecting means detects that the angular velocity sensor is connected to the input device.

Accordingly, depending on whether or not the angular velocity sensor is connected to the input device, the difficulty level of a game is changed, whereby an operational difficulty level for a player can be adjusted appropriately.

Further, the motion direction specifying means may calculate an attitude of the input device by using at least the angular velocity detected by the angular velocity sensor when the determination means has determined to use the angular velocity, and may calculate a direction of acceleration exerted on the input device by using the acceleration detected by the acceleration sensor, so as to specify the motion direction of the input device in an actual space by using the attitude and the direction of the acceleration exerted.

Accordingly, the attitude of the input device operated by a player is calculated by using the angular velocity applied to the input device, whereby the attitude of the input device can be calculated accurately, and as a result, the motion direction of the input device can be calculated accurately. The difficulty level of a game can be changed depending on the mode for recognizing the motion direction of the input device, and thus it is possible to appropriately adjust an operational difficulty level for the player.

Further, the motion direction specifying means may include attitude correction means. The attitude correction means corrects the attitude of the input device, the attitude being calculated by using the angular velocity detected by the angular velocity sensor, by using the acceleration detected by the acceleration sensor. In this case, the motion direction specifying means specifies the motion direction of the input device by using the attitude of the input device, the attitude having been corrected by the attitude correction means, and by using the direction of the acceleration exerted.

Accordingly, the attitude calculated by using the angular velocity applied to the input device is corrected by using the acceleration exerted on the input device, whereby the attitude of the input device can be calculated more accurately.

Further, when the determination means has determined not to use the angular velocity, the motion direction specifying means may calculate an attitude of the input device and a direction of acceleration exerted on the input device by using the acceleration detected by the acceleration sensor, and may specify the motion direction of the input device in an actual space by using the attitude and the direction of the acceleration.

Accordingly, when the attitude and motion direction of the input device operated by a player is calculated by using only the acceleration exerted on the input device, accuracy of the calculate will be relatively low. The difficulty level of a game can be changed depending on the accuracy of the mode for recognizing the motion direction of the input device, and thus an operational difficulty level for the player can be appropriately adjusted.

A second aspect of the present embodiment may be implemented in a form of a computer-readable storage medium having stored thereon a game program causing a computer of a game apparatus to function as the above-described respective means.

According to the present embodiment, in comparison between the case where the game process is performed by using the angular velocity detected by the angular velocity sensor provided to the input device and the case where the game process is performed without using the angular velocity, the difficulty level of the game varies depending on the cases. In this manner, the difficulty level of a game is changed depending on the mode for recognizing the motion of the input device operated by a player, whereby an operational difficulty level for the player can be adjusted appropriately.

These and other, features, aspects and advantages of the present embodiment will become more apparent from the following detailed description of the present embodiment when taken in conjunction with the accompanying drawings.

DESCRIPTION OF THE PREFERRED EMBODIMENTS

Figure 1:
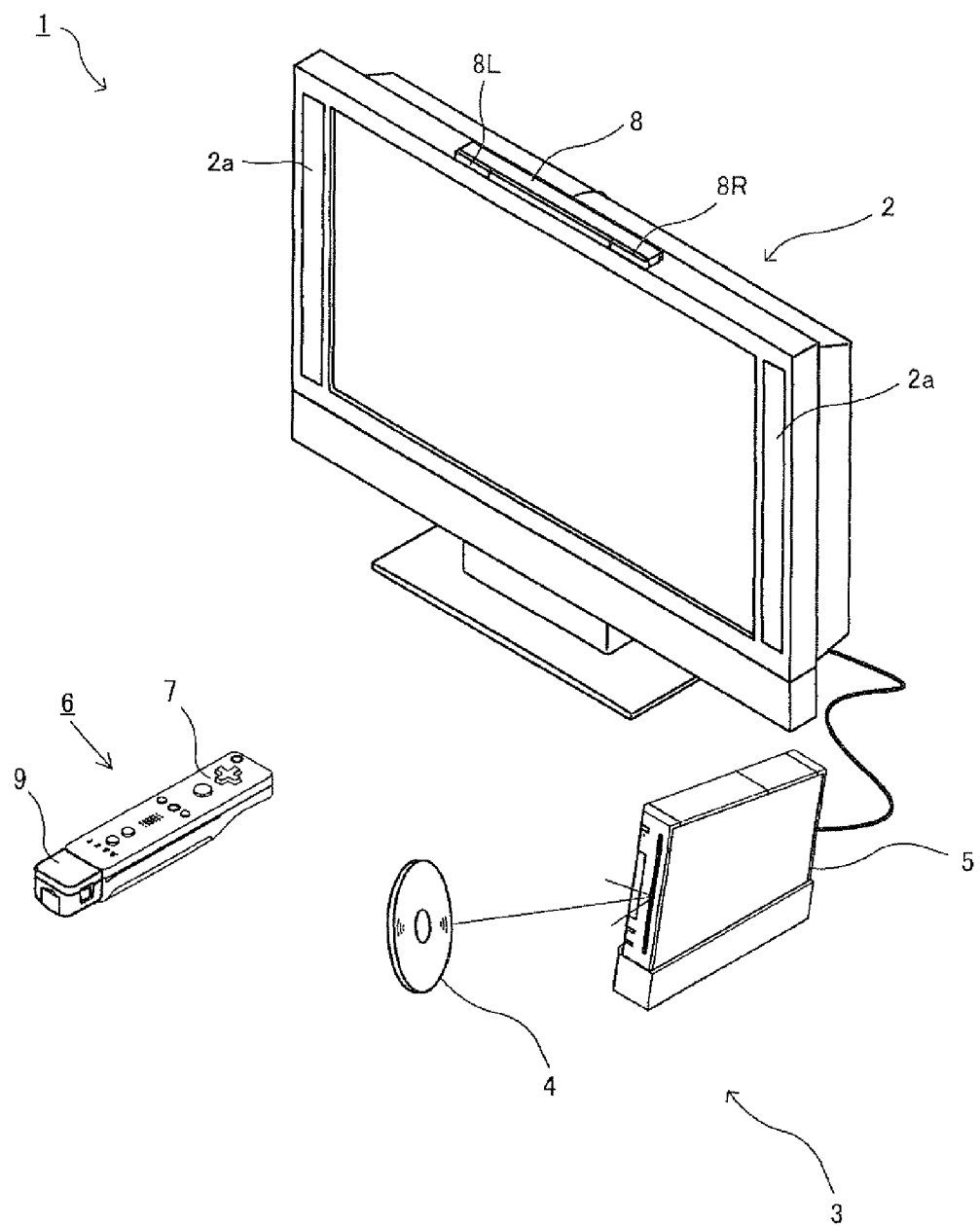
FIG. 1 is an outer appearance illustrating a game system 1 according to one embodiment.
Figure 2:
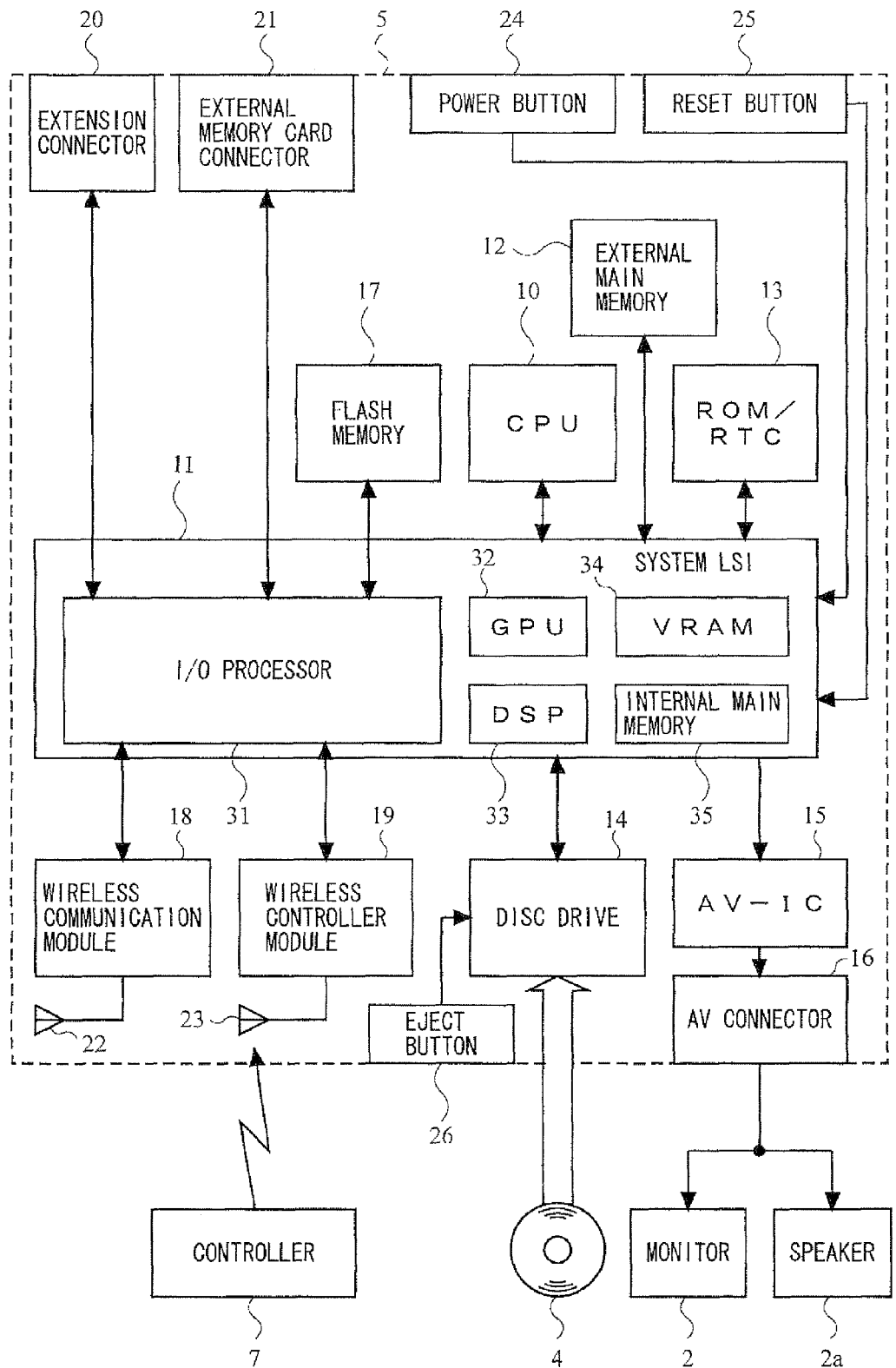
FIG. 2 is a functional block diagram of a game apparatus body 5 shown in FIG. 1.

With reference to FIG. 1, a game apparatus for executing a game program according to one embodiment will be described. Hereinafter, for the same of specific explanation, a game system including a stationary game apparatus body 5 will be described as an example. FIG. 1 is an outer appearance of a game system 1 including a stationary game apparatus 3. FIG. 2 is a block diagram of the game apparatus body 5. Hereinafter, the game system 1 will be described.

As shown in FIG. 1, the game system 1 includes a home television receiver (hereinafter referred to as a monitor) 2, which is exemplary display means, and a stationary game apparatus 3 which is connected to the monitor 2 via a connection cord. The monitor 2 includes speakers 2a for outputting sound based on an audio signal outputted from the game apparatus 3. Further, the game apparatus 3 includes an optical disc 4 having stored thereon a game program, which is an exemplary game program of the present invention, the game apparatus body 5 including a computer for executing the game program stored on the optical disc 4 so as to output and display a game screen on the monitor 2, and a unit-equipped controller 6 for providing the game apparatus body 5 with operational information necessary for a game in which a character or the like displayed on the game screen is operated.

The game apparatus body 5 incorporates therein a wireless controller module 19 (see FIG. 2). The wireless controller module 19 receives data wirelessly transmitted from the unit-equipped controller 6, and also transmits data from the game apparatus body 5 to the unit-equipped controller 6, thereby connecting the unit-equipped controller 6 and the game apparatus body 5 via wireless communication. Further, the optical disc 4, which is an exemplary information storage medium exchangeably used to the game apparatus body 5, is detachably inserted into the game apparatus body 5.

The game apparatus body 5 also incorporates therein a flash memory 17 (see FIG. 2) which functions as a backup memory for fixedly storing data such as save data. When a game program or the like stored on the optical disc 4 is executed, the game apparatus body 5 displays a result of the execution as a game image on the monitor 2. Further, the game program or the like need not be necessarily stored on the optical disc 4, but may be stored in advance in the flash memory 17 and executed. Still further, the game apparatus body 5 uses save data stored in the flash memory 17 so as to reproduce a state of a game played in the past, thereby displaying an image of the game on the monitor 2. A player playing with the game apparatus 3 can enjoy the game by operating the unit-equipped controller 6 while watching the image of the game displayed on the monitor 2.

The unit-equipped controller 6 provides the game apparatus body 5 with operation data indicative of details of an operation performed with respect to the unit-equipped controller 6. In the present embodiment, the unit-equipped controller 6 includes a controller 7 and an angular velocity detection unit 9. Although details will be described later, the unit-equipped controller 6 is configured such that the angular velocity detection unit 9 is detachably connected to the controller 7.

The controller 7 uses a technology of Bluetooth (registered trademark), for example, and wirelessly transmits transmission data such as operation information to the game apparatus body 5 incorporating therein the wireless controller module 19. The controller 7 has a housing which is small enough to be held by one hand, and a plurality of operation buttons (including a cross key, a stick, and the like) exposed at a surface of the housing. As described later in detail, the controller 7 includes an imaging information calculation section 74 for taking an image as viewed from the controller 7. As exemplary imaging targets of the imaging information calculation section 74, two LED modules 8L and 8R (hereinafter referred to as markers 8L and 8R) are provided in the vicinity of the display screen of the monitor 2. The markers 8L and 8R, for example, output infrared light forward from the monitor 2, respectively. Further, in the controller 7, the communication section 75 receives transmission data wirelessly transmitted from the wireless controller module 19 of the game apparatus body 5, whereby sound or vibration based on the transmission data is generated.

Next, with reference to FIG. 2, an internal configuration of the game apparatus body 5 will be described. FIG. 2 is a block diagram showing a configuration of the game apparatus body 5. The game apparatus body 5 has a CPU (Central Processing Unit) 10, a system LSI (Large Scale Integration) 11, an external main memory 12, an ROM/RTC (Read Only Memory/Real Time Clock) 13, a disc drive 14, an AV-IC (Audio Video Integrated Circuit) 15, and the like.

The CPU 10 performs a game process by executing a game program stored on the optical disc 4, and acts as a game processor. The CPU 10 is connected to the system LSI 11. In addition to the CPU 10, the external main memory 12, the ROM/RTC 13, the disc drive 14, and the AV-IC 15 are connected to the system LSI 11. The system LSI 11 performs processes such as control of data transmission among component parts connected to the system LSI 11, generation of an image to be displayed, and acquisition of data from external devices. An internal configuration of the system LSI 11 will be described later. The external main memory 12, which is a volatile memory, stores therein such a program as a game program loaded from the optical disc 4 or a game program loaded from the flash memory 17, and various data. The external main memory 12 is used as a work area or a buffer area of the CPU 10. The ROM/RTC 13 has a ROM (so called a boot ROM) Incorporating a program for booting up the game apparatus body 5, and a clock circuit (RTC) for counting time. The disc drive 14 reads program data, texture data, and the like from the optical disc 4, and writes the read data into an internal main memory 35 to be described later or the external main memory 19.

Further, provided to the system LSI 11 are an input/output processor 31, a CPU (Graphics Processor Unit) 32, a DSP (Digital Signal Processor) 33, a VRAM (Video RAM) 34, and the internal main memory 35. Although not shown in drawings, these component parts 31 to 35 are connected to one another via an internal bus.

The GPU 32 functions as a part of drawing means, and generates an image in accordance with a graphics command (draw command) from the CPU 10. The VRAM 34 stores therein data (such as polygon data and texture data) necessary for the GPU 32 to execute the graphics command. When an image is to be generated, the GPU 32 uses data stored in the VRAM 34 and generates image data.

The DSP 33 functions as an audio processor, and generates audio data by using sound data and sound waveform (tone quality) data stored in the internal main memory 35 or the external main memory 12.

The image data and the audio data generated as described above are read by the AV-IC 15. The AV-IC 15 outputs the read image data to the monitor 2 via the AV connector 16, and also outputs the read audio data to the speakers 2a provided on the monitor 2. Accordingly, the image is displayed on the monitor 2, and the sound is outputted from the speakers 2a.

The input/output (I/O) processor 31 executes transmission of data between component parts connected to the I/O processor 31, and also executes downloading of data from external devices. The I/O processor 31 is connected to the flash memory 17, the wireless communication module 18, the wireless controller module 19, an expansion connector 20, and an external memory card connector 21. An antenna 22 is connected to the wireless communication module 18, and an antenna 23 is connected to the wireless controller module 19.

The I/O processor 31 is connected to a network via the wireless communication module 18 and the antenna 22, and is capable of communicating with another game apparatus and various servers connected to the network. The I/O processor 31 accesses the flash memory 17 on a regular basis so as to detect data, if any, which is necessary to be transmitted to the network. If the data is detected, the detected data is transmitted to the network via the wireless communication module 18 and the antenna 22. The I/O processor 31 receives data transmitted from another game apparatus and data downloaded from a download server, via the network, the antenna 22, and the wireless communication module 18, and stores the received data in the flash memory 17. The CPU 10 executes the game program, and reads the data stored in the flash memory 17 to be used while executing the game program. In the flash memory 17, not only data transmitted between the game apparatus body 5 and another game apparatus or various servers, but also save data (result data or progress data) of a game played by using the game apparatus body 5 may be stored.

The I/O processor 31 also receives operation data and the like, which is transmitted from the controller 7 (unit-equipped controller 6) via the antenna 23 and the wireless controller module 19, and (temporarily) stores the operation data in the internal main memory 35 or in the buffer area of the external main memory 12. As with the external main memory 12, the internal main memory 35 may be used for storing the game programs read from the optical disc 4 or from the flash memory 17, and various data, and may be used as the work area or the buffer area of the CPU 10.

The expansion connector 20 and the external memory card connector 21 are connected to the I/O processor 31. The expansion connector 20 is an interface connector as typified by a USB and an SCSI, and is capable of performing communication with the network, instead of the wireless communication module 18, by connecting thereto a medium such as an external storage medium, a peripheral device such as another controller, or a wired communication connector. The external memory card connector 21 is a connector for connecting thereto the external storage medium such as a memory card. For example, the I/O processor 31 accesses the external storage medium via the expansion connector 20 or the external memory card connector 21, and then saves data or reads data.

Provided to (for example, on the front main surface of) the game apparatus body 5 are a power button 24 for the game apparatus body 5, a reset button 25 for a game process, an insertion slot in which the optical disc 4 is inserted, an eject button 26 for causing the optical disc 4 to be ejected from the insertion slot of the game apparatus body 5, and the like. The power button 24 and the reset button 25 are connected to the system LSI 11. When the power button 24 is turned on, power is supplied to each of the component parts of the game apparatus body 5 via an AC adaptor, which is not shown. When the reset button 25 is pressed, the system LSI 11 reboots the boot-up program of the game apparatus body 5. The eject button 26 is connected to the disc drive 14. When the eject button 26 is pressed, the optical disc 4 is ejected from the disc drive 14.

Figure 3:
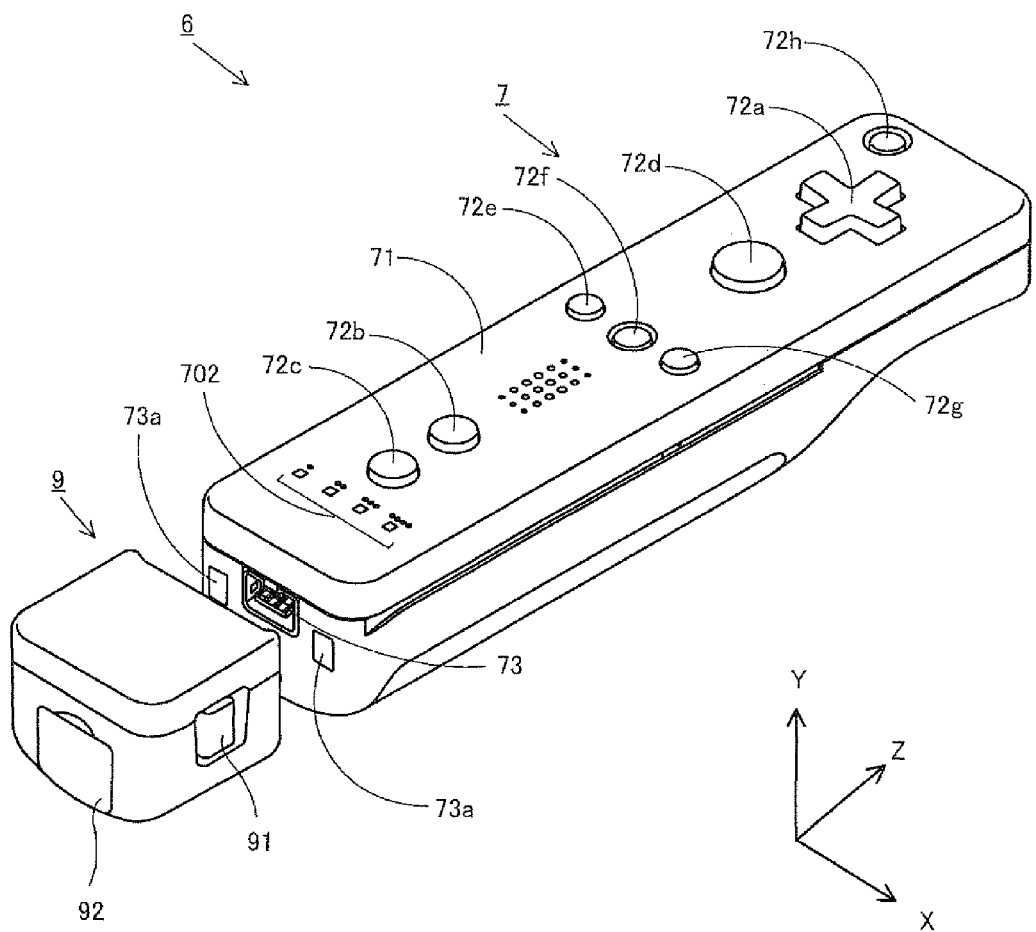
FIG. 3 is a perspective view of a unit-equipped controller 6 as viewed from a top rear side thereof shown in FIG. 1.
Figure 4:
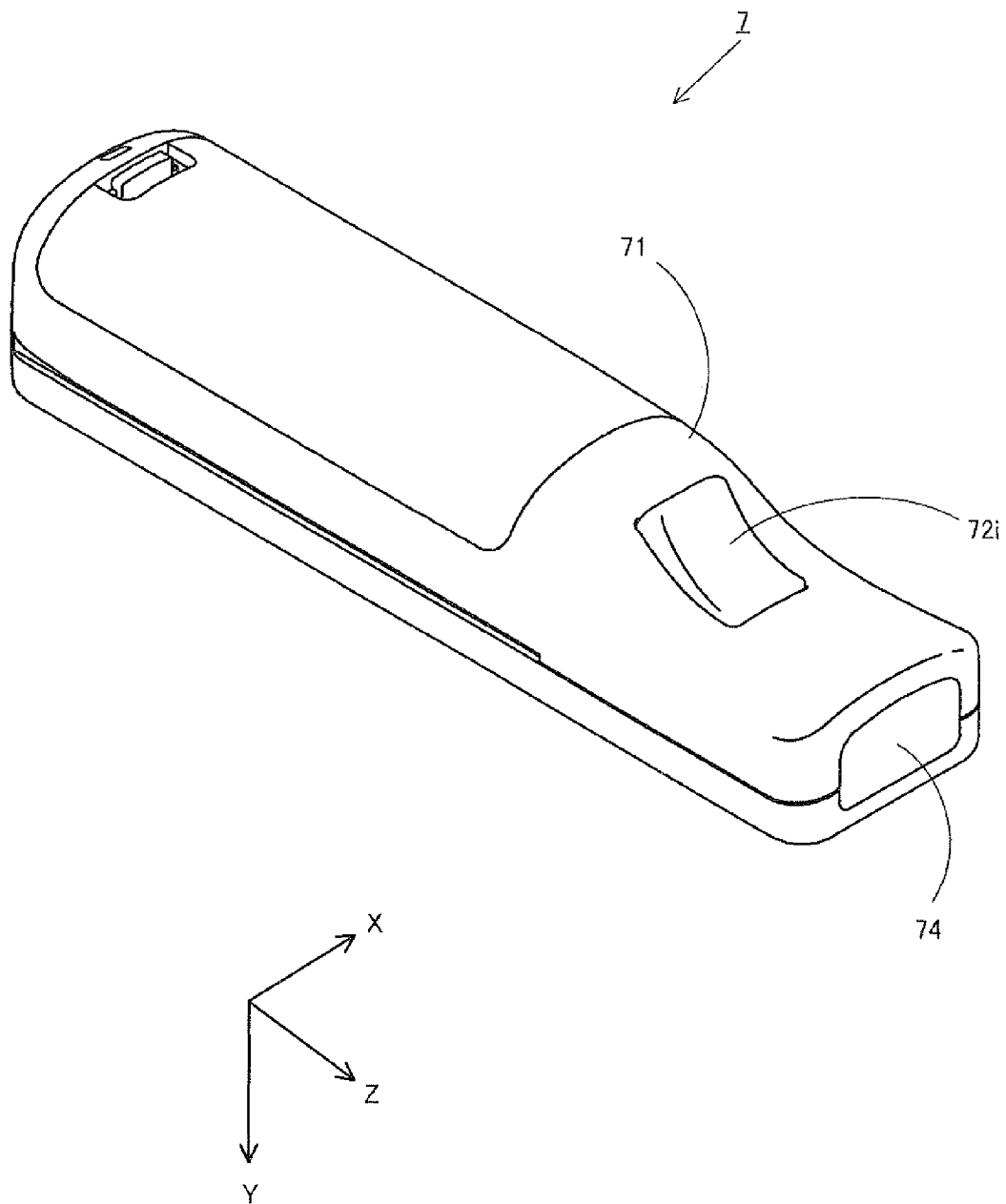
FIG. 4 is a perspective view of a controller 7 as viewed from a bottom front side thereof shown in FIG. 3.

With reference to FIGS. 3 and 4, the unit-equipped controller 6 will be described. FIG. 3 is an exemplary perspective view of the unit-equipped controller 6 as viewed from a top rear side thereof. FIG. 4 is an exemplary perspective view of the controller 7 as viewed from a bottom front side thereof.

As shown in FIGS. 3 and 4, the controller 7 includes a housing 71 which is formed by plastic molding, for example, and a plurality of operation sections 72 are provided on the housing 71. The housing 71 has a substantially parallelepiped shape extending in a longitudinal direction from front to rear, and an overall size thereof is small enough to be held by one hand of an adult or even of a child.

At a front center portion of a top surface of the housing 71, a cross key 72a is provided. The cross key 72a is a cross-shaped four direction push switch, and operation portions thereof are respectively located on cross-shaped projecting portions arranged at intervals of 90 degrees such that the operation portions correspond to four directions (front, rear, right, and left). A player selects one of the front, rear, right, and left directions by pressing one of the operation portions of the cross key 72a. Through an operation of the cross key 72a, the player can indicate a direction in which a player character or the like appearing in a virtual game world is to move, or select an instruction from a plurality of choices.

The cross key 72a is an operation section for outputting an operation signal in accordance with the direction input operation performed by the player as described above, and the operation section may be provide in another form. For example, the operation section may be provided such that four push switches are arranged in the cross directions and an operation signal is outputted by the player's pressing one of the four push switches. Further, in addition to the four push switches, a center switch may be provided at a crossing portion of the above-described cross directions so as to provide an operation section composed of the four push switches and a center switch. Alternatively, the cross key 72a may be replaced with an operation section which includes an inclinable stick (so called a joystick) projecting from the top surface of the housing 71 and which outputs the operation signal in accordance with an inclining direction of the stick. Still alternatively, the cross key 72a may be replaced with an operation section which includes a disc-shaped member horizontally slidable and outputs an operation signal in accordance with an sliding direction of the disc-shaped member. Still alternatively, the cross key 72a may be replaced with a touchpad.

Behind the cross key 72a on the top surface of the housing 71, a plurality of operation buttons 72b to 72g are provided. The operation buttons 72b to 72g are each an operation section for outputting an operation signal assigned thereto when the player presses a head thereof. For example, functions such as a No. 1 button, a No. 2 button, and an A button and the like are assigned to the operation buttons 72b to 72d. Further, functions such as a minus button, a home button, a plus button and the like are assigned to the operation buttons 72e to 72g. Various operation functions are assigned to these operation buttons 72a to 72g in accordance with the game program executed by the game apparatus body 5. In an exemplary arrangement shown in FIG. 3, the operation buttons 72b to 72d are arranged in a line at the center in a front-rear direction on the top surface of the housing 71. Further, the operation buttons 72e to 72g are arranged in a line on the top surface of the housing 71 in a left-right direction between the operation buttons 72b and 72d. The operation button 72f has a top surface thereof buried in the top surface of the housing 71 to reduce the possibility of inadvertent pressing by the player.

In front of the cross key 72a on the top surface of the housing 71, an operation button 72h is provided. The operation button 72h is a power switch for turning on and off the power to the game apparatus body 5 by remote control. The operation button 72h also has atop surface thereof buried in the top surface of the housing 71 to reduce the possibility of inadvertent pressing by the player.

Behind the operation button 72c on the top surface of the housing 71, a plurality of LEDs 702 is provided. A controller type (number) is assigned to the controller 7 so as to be distinguishable from another controller 7. For example, the LEDs 702 may be used to provide a player a visual indication of the controller type assigned to the controller 7. Specifically, a signal is transmitted, from the wireless controller module 19 to the controller 7, so as to light a LED corresponding to the above-described controller type among the plurality of LEDs 702.

On the top surface of the housing 71, speaker holes for emitting sound from a speaker (a speaker 706 shown in FIG. 5), which is to be described later, are formed between the operation button 72b and the operation buttons 72e to 72g.

On a bottom surface of the housing 71, a recessed portion is formed. The recessed portion on the bottom surface of the housing 71 is formed in a position in which an index finger or middle finger of the player is located when the player holds the controller with one hand and points a front portion thereof to the markers 8L and 8R. On a slope surface of the recessed portion, an operation button 72i is provided. The operation button 72i is an operation section acting as, for example, a B button.

On a front surface of the housing 71, an image pickup element 743 constituting a part of an imaging information calculation section 74 is provided. The imaging information calculation section 74 is a system which analyzes imaged at a picked up by the controller 7, identifies a high brightness area in the image, and detects the center of gravity and a size or the like of the area. For example, the imaging information calculation section 74 has a maximum sampling period of about 200 frames/sec., and thus can trace and analyze even a relatively fast motion of the controller 7. A configuration of the imaging information calculation section 74 will be described later in detail. On a rear surface of the housing 71, a connector 73 is provided. The connector 73 is, for example, an edge connector, and is used for coupling and connecting the controller with a connection cable. In the case of the exemplary unit-controller 6 shown in FIG. 1 and FIG. 3, the angular velocity detection unit 9 is detachably connected to the rear surface of the controller 7 via the connector 73.

For the sake of detail explanation, a coordinate system set for the unit-equipped controller 6 (controller 7) will be defined. As shown in FIGS. 3 and 4, an X-axis, a Y-axis, and a Z-axis which are perpendicular to one another are defined with respect to the unit-equipped controller 6 (controller 7). Specifically, a longer direction, which is the front-rear direction, of the housing 71 is defined as the Z-axis, and a direction toward the front surface (a surface on which the imaging information calculation section 74 is provided) of the controller 7 is defined as a Z-axis positive direction. An up-down direction of the controller 7 is defined as the Y-axis, and a direction toward the top surface (a surface on which the operation button 72a is provided) of the housing 71 is defined as a Y-axis positive direction. Further, the left-right direction of the controller 7 is defined as the X-axis direction, and a direction toward the right side surface (a side surface shown FIG. 3) of the housing 71 is defined as an X-axis positive direction.

Figure 7:
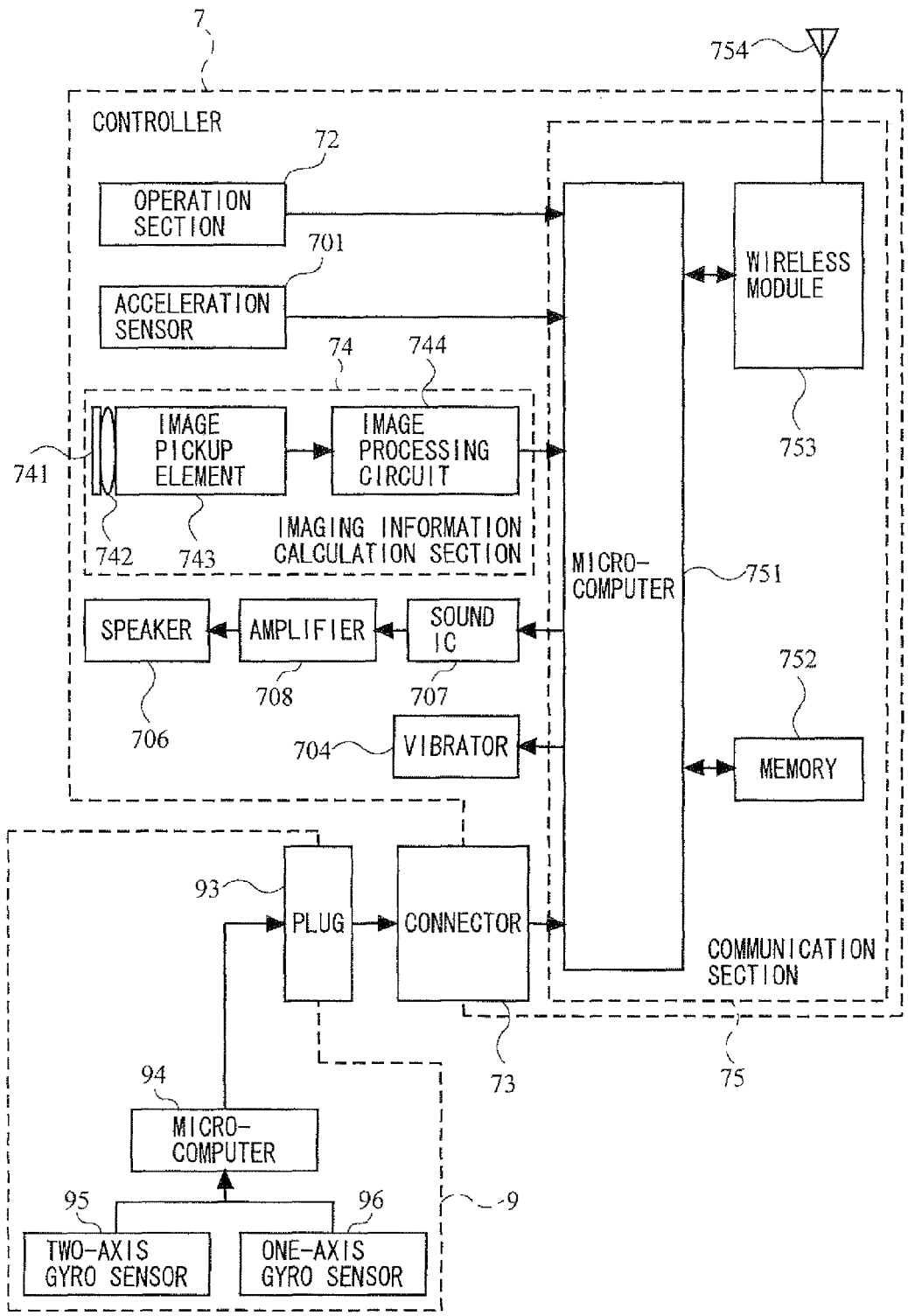
FIG. 7 is a block diagram showing a configuration of the unit-equipped controller 6 shown in FIG. 3.

The angular velocity detection unit 9 includes gyro sensors (a two-axis gyro sensor 95 and a one-axis gyro sensor 96 shown in FIG. 7) for detecting angular velocities around three axes. At a front edge of the angular velocity detection unit 9 (an edge on the Z-axis positive direction side shown in FIG. 3), a plug (plug 93 shown in FIG. 7) connectable to the connector 73 is provided. Further hooks (not shown) are provided on both sides of the plug 93, respectively. When the angular velocity detection unit 9 is mounted to the controller 7, the plug 93 is connected to the connector 73, and the hooks engage in locking holes 73a of the controller 7. Accordingly, the controller 7 and the angular velocity detection unit 9 are firmly fixed to each other. Further, the angular velocity detection unit 9 has a button 91 on each side surface (surfaces facing toward the X-axis direction shown in FIG. 3). The buttons 91 are configured such that when the buttons 91 are pressed, the hooks are disengaged from the locking holes 73a. Therefore, when the plug 93 is removed from the connector 73 while the buttons 91 are being pressed, the angular velocity detection unit 9 can be disconnected from the controller 7. Accordingly, the player can operate the controller 7 having the angular velocity detection unit 9 mounted thereto, or operate the controller 7 only by removing the angular velocity detection unit 9 therefrom.

Provided at a rear edge of the angular velocity detection unit 9 is a connector having the same shape as the connector 73. Thus, an apparatus mountable to (the connector 73 of) the controller 7 is also mountable to the rear edge connector of the angular velocity detection unit 9. In FIG. 3, a cover 92 is detachably mounted to the rear edge connector.

Figure 5:
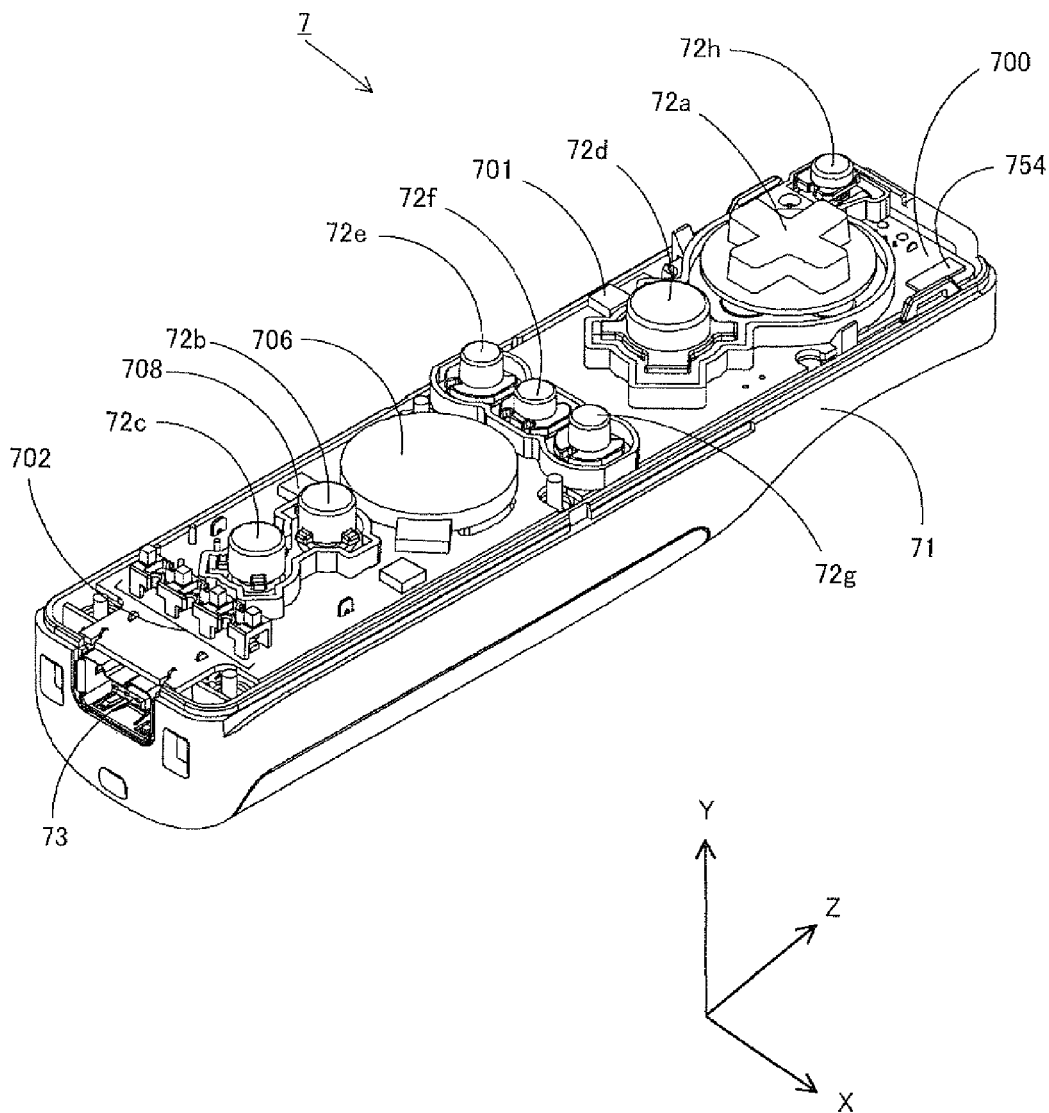
FIG. 5 is a perspective view of the controller 7 shown in FIG. 3 in a state where an upper housing thereof is removed.
Figure 6:
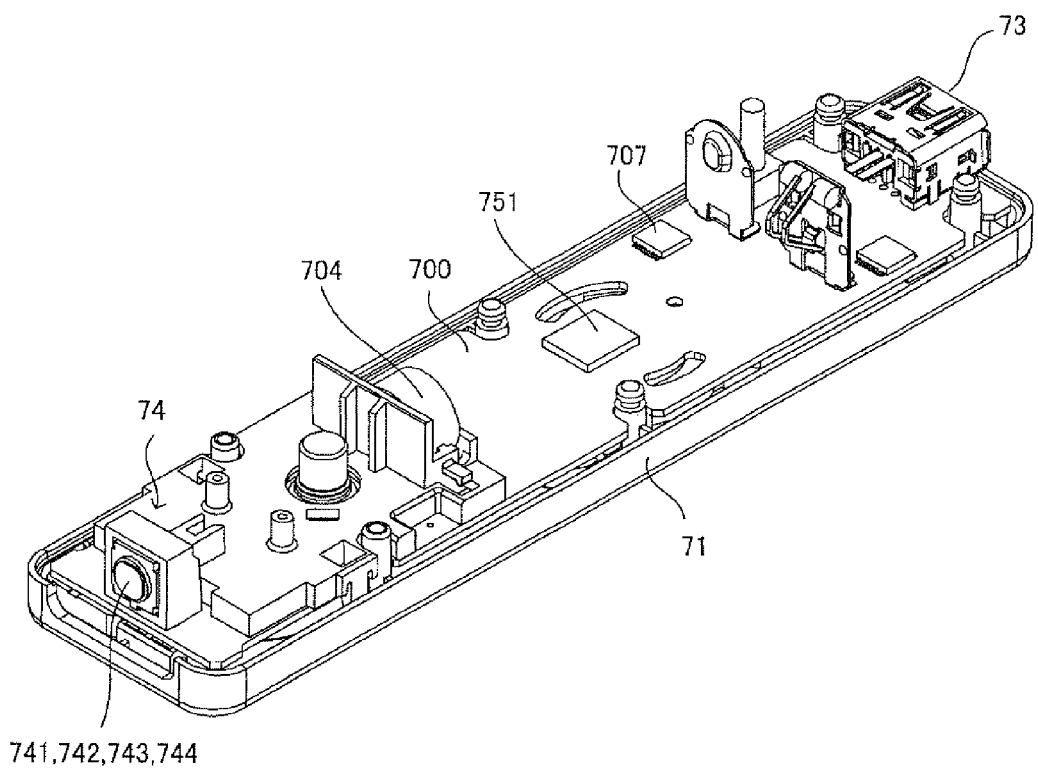
FIG. 6 is a perspective view of the controller 7 shown in FIG. 4 in a state where a lower housing thereof is removed.

Next, with reference to FIGS. 5 and 6, an internal structure of the controller 7 will be described. FIG. 5 is a perspective view illustrating the controller 7, as viewed from the top rear surface thereof, in a state where an upper casing (a part of the housing 71) thereof is removed. FIG. 6 is a perspective view illustrating the controller 7, as viewed from the front side thereof, in a state where a lower casing (a part of the housing 71) thereof is removed. FIG. 6 shows a perspective view illustrating a reverse side of a substrate 700 shown in FIG. 5.

As shown in FIG. 5, the substrate 700 is fixed inside the housing 71. On a top main surface of the substrate 700, the operation buttons 72a to 72h, an acceleration sensor 701, the LEDs 702, an antenna 754, and the like are provided. These elements are connected to a microcomputer 751 (see FIGS. 6 and 7) and the like via lines (not shown) formed on the substrate 700 and the like. The wireless module 753 (see FIG. 7) and the antenna 754 allow the controller 7 to act as a wireless controller. A quartz oscillator (not shown) is provided inside the housing 71, and generates a reference clock of the microcomputer 751 to be described later. On a top main surface of the substrate 700, the speaker 706 and an amplifier 708 are provided. Further, the acceleration sensor 701 is provided on the substrate 700 to the left of the operation button 72d (that is, not at the center portion of the substrate 700 but near the periphery of the substrate 700). Accordingly, in addition to a directional change of gravity acceleration, the acceleration sensor 701 is capable of detecting acceleration including an acceleration component exerted by a centrifugal force in accordance with the controller 7 rotating about the longer direction thereof. Therefore, the game apparatus body 5 or the like is capable of determining, through a predetermined calculation, a motion of the controller 7 sufficiently accurately in accordance with the detected acceleration data.

As shown in FIG. 6, at a front edge of a bottom main surface of the substrate 700, the imaging information calculation section 74 is provided. The imaging information calculation section 74 includes an infrared filer 741, a lens 742, the image pickup element 743, and an image processing circuit 744, located in this order from the front surface of the controller 7 on the bottom surface of the substrate 700. To a rear edge of the bottom main surface of the substrate 700, the connector 73 is attached. Further, on the bottom main surface of the substrate 700, a sound IC 707 and the microcomputer 751 are provided. The sound IC 707, which is connected to the microcomputer 751 and the amplifier 708 via the line formed on the substrate 700 and the like, outputs an audio signal to the speaker 706 via the amplifier 708 in accordance with the sound data transmitted from the game apparatus body 5.

On the bottom main surface of the substrate 700, a vibrator 704 is attached. The vibrator 704 may be, for example, a vibration motor or a solenoid. The vibrator 704 is connected to the microcomputer 751 via the line formed on the substrate 700 and the like, and is powered on/off in accordance with vibration data transmitted from the game apparatus body 5. The controller 7 is vibrated by an actuation of the vibrator 704, and the vibration is conveyed to the player's hand holding the controller 7. Thus, a so-called vibration-responsive game may be realized. The vibrator 704 is provided near the front part of the housing 71, and therefore, a large vibration of the housing 71 allows the player holding the controller 7 to easily feel the vibration.

Next, with reference to FIG. 7, an internal configuration of the unit-equipped controller 6 (controller 7 having the angular velocity detection unit 9) will be described. FIG. 7 is a block diagram illustrating an exemplary configuration of the unit-equipped controller 6.

As shown in FIG. 7, the controller 7 includes the communication section 75, in addition to the operation section 72, the imaging information calculation section 74, the acceleration sensor 701, the vibrator 704, the speaker 706, the sound IC 707, and the amplifier 708 as described above.

The imaging information calculation section 74 includes the infrared filer 741, the lens 742, the image pickup element 743, and the image processing circuit 744. The infrared filer 741 allows only infrared light to pass therethrough, among light incident on the front surface of the controller 7. The lens 742 converges the infrared light having passed through the infrared filer 741 and outputs the infrared light to the image pickup element 743. The image pickup element 743 is a solid-state image pickup element such as a CMOS sensor or a CCD. The image pickup element 743 takes an image of the infrared light converged by the lens 742. Therefore, the image pickup element 743 takes an image of only the infrared light having passed through the infrared filer 741, and generates image data. The image data generated by the image pickup element 743 is processed by the image processing circuit 744. Specifically, the image processing circuit 744 processes the image data obtained from image pickup element 743, detects a high brightness area, and outputs process result data to the communication section 75, the process result data being indicative of a coordinate point and a size of the detected area. The imaging information calculation section 74 is fixed to the housing 71 of the controller 7, and thus an imaging direction thereof can be changed by changing the direction of the housing 71.

The controller 7 preferably includes a three-axis (X-axis, Y-axis, Z-axis) acceleration sensor 701. The three-axis acceleration sensor 701 detects a linear acceleration in three directions, i.e., the up-down direction (Y-axis shown in FIG. 3), the left-right direction (X-axis shown in FIG. 3), and the front-rear direction (Z-axis shown in FIG. 3). Further, an accelerometer capable of detecting linear acceleration in at least one axis direction (e.g., X-axis and Y-axis) may be used, alternatively. For example, the acceleration sensor 701 as described above may be of the type available from Analog Devices, Inc. or STMicroelectronics N.V. Preferably, the acceleration sensor 701 is an electrostatic capacitance (capacitance-coupling) type that is based on silicon micro-machined MEMS (Micro Electro Mechanical Systems) technology. However, any other suitable technology of accelerometer (for example, piezoelectric type or piezoresistance type) now existing or to be developed later may be used to provide the acceleration sensor 701.

An accelerometer used in the acceleration sensor 701 is capable of detecting acceleration (linear acceleration) only along a straight line corresponding to each axis of the acceleration sensor 701. In other words, directly output from the acceleration sensor 701 is a signal indicative of the linear acceleration (static or dynamic) along each of the three axes. As a result, the acceleration sensor 701 cannot directly detect movement along non-linear (e.g., arcute) path, rotation, rotational movement, angular displacement, tilt, position, posture, or any other physical characteristic.

However, when a computer, such as a processor (e.g., the CPU 10) of the game apparatus or a processor (e.g., the microcomputer 751) of the controller, processes acceleration signal outputted from the acceleration sensor 701, additional information relating to the controller 7 can be inferred or calculated (determined), as one skilled in the art will readily understand from the description herein.

For example, suppose a case where the computer processes the acceleration signal outputted from the acceleration sensor 701 of the controller 7 in a static state (that is, a case where it is anticipated that acceleration detected by the acceleration sensor 701 includes gravity acceleration only). In the case where the controller 7 is actually in a static state, it is possible to determine whether or not the controller 7 tilts relative to the direction of gravity and also to determine a degree of the tilt, based on the detected acceleration. Specifically, when a detected axis of the acceleration sensor 701 is directed to a vertically-downward direction, and such a situation is set as a reference, then it is possible to determine whether or not the controller 7 tilts relative to the vertically-downward direction, based on only whether or not 1 G (gravity acceleration) is applied in the detected axis direction. Further, based on the magnitude of the acceleration applied in the detected axis direction, it is possible to determine a degree of the tilt of the controller 7 relative to the vertically-downward direction. Further, in the case of the acceleration sensor 701 which is capable of detecting the acceleration in multi-axis directions, an acceleration signal detected along each of the axes is processed, whereby it is possible to determine the tilt of the controller 7 relative to the direction of gravity. In this case, in accordance with an output from the acceleration sensor 701, data indicative of a tilt angle of the controller 7 may be calculated by the processor. Alternatively, without calculating the data indicative of the tilt angle, an approximate degree of the tilt of the controller 7 may be inferred based on the output from the acceleration sensor 701. In this manner, it is possible to determine the tilt, the posture, or the position of the controller 7 by using the acceleration sensor 701 and the processor in a combined manner.

On the other hand, in the case where the acceleration sensor 701 is in a dynamic state, the acceleration sensor 701 detects acceleration based on a movement of the acceleration sensor 701 in addition to the gravity acceleration component. Therefore, when the gravity acceleration component is eliminated through a predetermined process, it is possible to determine, for example, a direction in which the controller 7 moves. Specifically, when the controller 7 including the acceleration sensor 701 is dynamically accelerated and moved by a hand of a player, it is possible to calculate various motions and/or positions of the controller 7 by processing the acceleration signals generated by the acceleration sensor 701. Even in the case where the acceleration sensor 701 is in a dynamic state, it is possible to determine the tilt of the controller 7 relative to the direction of gravity provided that the acceleration based on the movement of the acceleration sensor 701 is eliminated through the predetermined process.

In another embodiment, the acceleration sensor 701 may include an embedded signal processor or another type of dedicated processor for performing any desired process on the acceleration signal which is outputted from an embedded accelerometer before the signal is outputted to the microcomputer 751. For example, when the acceleration sensor 701 is designed to detect static acceleration (for example, the gravity acceleration), the embedded signal processor or the dedicated processor may convert the detected acceleration signal into a corresponding tilt angle (or another preferable parameter). Data indicative of the acceleration detected by the acceleration sensor 701 is outputted to the communication section 75.

The communication section 7D includes the microcomputer 751, a memory 752, the wireless module 753, and the antenna 754. At the time of processing, the microcomputer 751 controls the wireless module 753 for wirelessly transmitting transmission data while using the memory 752 as a storage area. Further, the microcomputer 751 controls operations of the sound IC 707 and the vibrator 704 in accordance with the data received by the wireless module 753 from the game apparatus body 5 via the antenna 754. The sound IC 707 processes the sound data and the like transmitted from the game apparatus body 5 via the communication section 75. Further, the microcomputer 751 actuates the vibrator 704 in accordance with vibration data (e.g., a signal for turning the vibrator 704 "ON" or "OFF") transmitted from the game apparatus body 5 via the communication section 75. Further, the microcomputer 751 is connected to the connector 73. Data transmitted from the angular velocity detection unit 9 is inputted to the microcomputer 751 via the connector 73. Hereinafter, a configuration of the angular velocity detection unit 9 will be described.

The angular velocity detection unit 9 includes the plug 93, the microcomputer 94, the two-axis gyro sensor 95, and the one-axis gyro sensor 96. As described above, the angular velocity detection unit 9 detects angular velocities around three axes (the X-axis Y-axis, and Z-axis in the present embodiment), and outputs data (angular velocities) indicative of the detected angular velocities to the controller 7.

The two-axis gyro sensor 95 detects angular velocities (per unit time) around the Y-axis and around the X-axis, respectively. Further, the one-axis gyro sensor 96 detects an angular velocity (per unit time) around the Z-axis.

In the present embodiment, in order to detect the angular velocities around the three axes, the two-axis gyro sensor 95 and the one-axis gyro sensor 96 are used, however, in another embodiment, the number and the combination of the gyro sensors may be determined arbitrarily as long as the angular velocities around the three axes can be detected. The two-axis gyro sensor 95 and the one-axis gyro sensor 96 will be collectively described as the gyro sensors 95 and 96.

Data indicative of the angular velocities detected by the gyro sensors 95 and 96 is outputted to the microcomputer 94. Therefore, data indicative of the angular velocities around three of the X-axis, Y-axis, and Z-axis is inputted to the microcomputer 94. The microcomputer 94 outputs, as angular velocity data, data indicative of the angular velocities around the above-described three axes to the controller 7 via the plug 93. The output from the microcomputer 94 to the controller 7 is performed sequentially in predetermined cycles. Since the game process is generally performed in a cycle of 1/60 sec. (as one frame time), the wireless transmission is preferably performed in a cycle of a shorter time period.

The controller 7 will be described again. Data from the controller 7 such as an operation signal (key data) from the operation section 72, an acceleration signal in the three axis directions (X-axis, Y-axis, and Z-axis direction acceleration data) from the acceleration sensor 701, process result data from the imaging information calculation section 74, and data indicative of the angular velocities around the three axes (X-axis, Y-axis, and Z-axis angular velocity data) from the angular velocity detection unit 9 are outputted to the microcomputer 751. The microcomputer 751 temporarily stores the inputted data (the key data, the X-axis, Y-axis, and Z-axis direction acceleration data, the process result data, and the X-axis, Y-axis, and Z-axis angular velocity data) in the memory 752 as transmission data to be transmitted to the wireless controller module 19. The wireless transmission from the communication section 75 to the wireless controller module 19 is performed in predetermined time cycles. Since the game process is generally performed in a cycle of 1/60 sec., the wireless transmission needs to be performed in a cycle of a shorter time period. Specifically, the game process is performed in a cycle of 16.7 ms (1/60 sec.), and a transmission cycle of the communication section 75 composed of the Bluetooth (registered trademark) is 5 ms. At a timing of performing a wireless transmission to the wireless controller module 19, the microcomputer 751 outputs, to the wireless module 753, the transmission data stored in the memory 752 as a series of pieces of operation information. The wireless module 753 then uses the Bluetooth (registered trademark) technology, for example, so as to emit a radio signal indicative of the operation information from the antenna 754 by using a carrier wave having a predetermined frequency. In other words, data including the key data from the operation section 72, the X-axis, Y-axis and Z-axis direction acceleration data from the acceleration sensor 701, the process result data from the imaging information calculation section 74, and the X-axis, Y-axis, and Z-axis angular velocity data received from the angular velocity detection unit 9 is transmitted from the controller 7. The wireless controller module 19 of the game apparatus body 5 receives the radio signal, and the radio signal is demodulated or decoded in the game apparatus body 5, whereby a series of pieces of operation information (such as the key data, the X-axis, Y-axis, and Z-axis direction acceleration data, the process result data, and the X-axis, Y-axis, and Z-axis angular velocity data) is obtained. The CPU 10 included in the game apparatus body 5 performs the game process based on the obtained operation information and on the game program. In the case where the communication section 75 is configured by using the Bluetooth (registered trademark) technology, the communication section 75 may have a function of receiving transmission data wirelessly transmitted from another device.

By using the unit-equipped controller 6, the player can perform not only a general game operation of pressing respective operation buttons, which is conventionally introduced, but can also perform an operation of tilting the unit-equipped controller 6 at an arbitrary tilt angle. In addition, by using the unit-equipped controller 6, the player can perform an operation of pointing the unit-equipped controller 6 to a given position on a screen, and can perform an operation of moving the unit-equipped controller 6.

Data indicative of whether or not the angular velocity detection unit 9 is mounted to the controller 7 is included in the above-described series of pieces of operation information, and then transmission data may be transmitted from the controller 7 to the game apparatus body 5. By analyzing the transmission data, it is possible for the game apparatus body 5 to promptly determine whether or not the angular velocity detection unit 9 is mounted to the controller 7. When the angular velocity detection unit 9 is not mounted to the controller 7, that is, when the player operates the controller 7 only, the data indicative of the angular velocities around the three axes (X-axis, Y-axis, Z-axis angular velocity data) received from the angular velocity detection unit 9 will not be outputted to the microcomputer 751. In this case, the microcomputer 751 temporarily stores inputted data (the key data, the X-axis, Y-axis, and X-axis direction acceleration data, and the process result data) in the memory 752 as the transmission data to be transmitted to the wireless controller module 19, and then transmits the inputted data to the game apparatus body 5. That is, the game apparatus body 5 is able to determine whether or not the angular velocity detection unit 9 is mounted to the controller 7 depending on whether or not the X-axis, Y-axis, and Y-axis angular velocity data are included in the transmission data from the controller 7. In the following description, there may be a case where the input device including the controller 7 without having the angular velocity detection unit 9 is referred to as the "controller 7 only" and the input device including the controller 7 having the angular velocity detection unit 9 mounted thereto is referred to as the "unit-equipped controller 6" so as to distinguish both. The controller 7 only and the unit-equipped controller 6 correspond to examples of the input device of the present invention.

Figure 8:
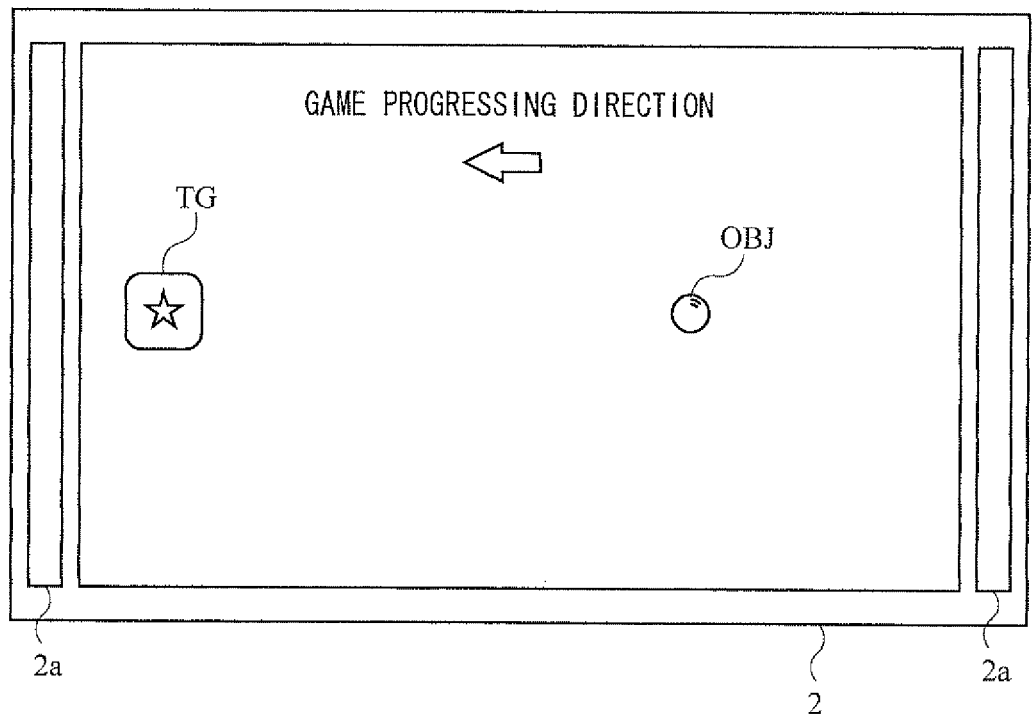
FIG. 8 is a diagram showing an exemplary game image displayed on a monitor 2.
Figure 9:
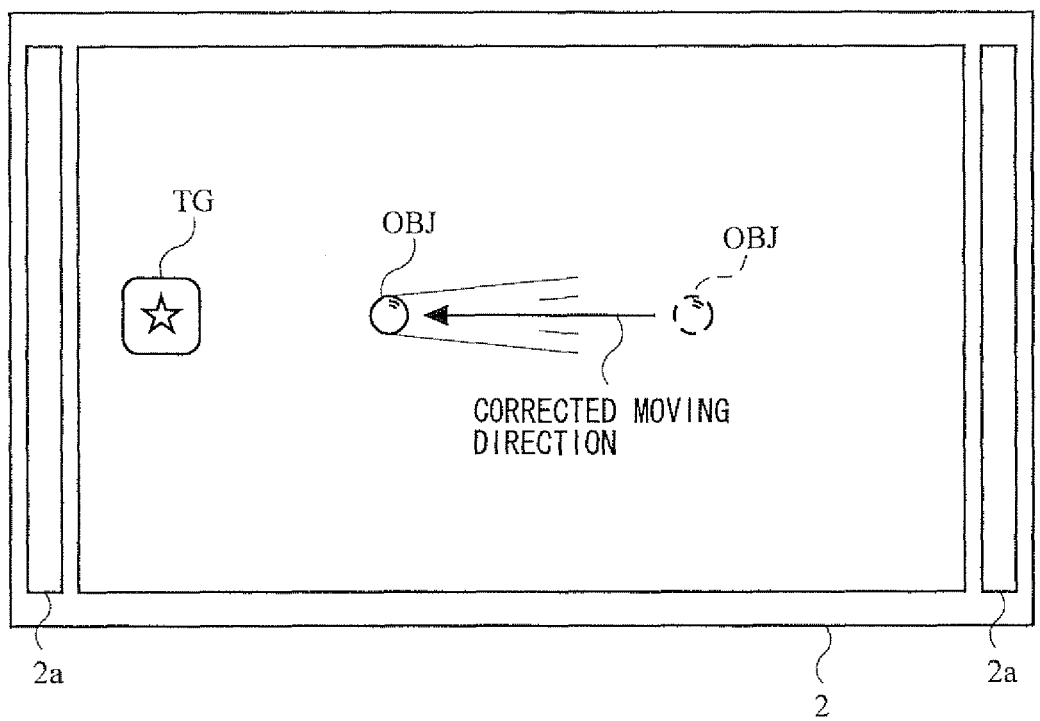
FIG. 9 is a diagram showing an example of a player object OBJ moving in accordance with a swinging motion of the controller 7 only while the controller 7 is swung.
Figure 9:
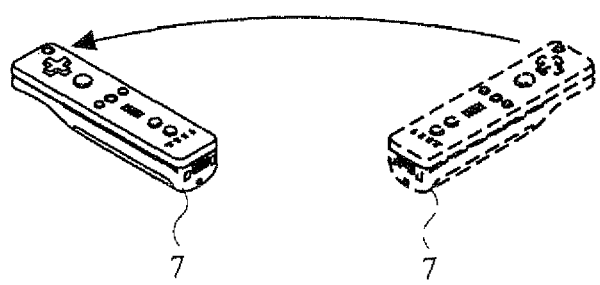
Figure 10A:
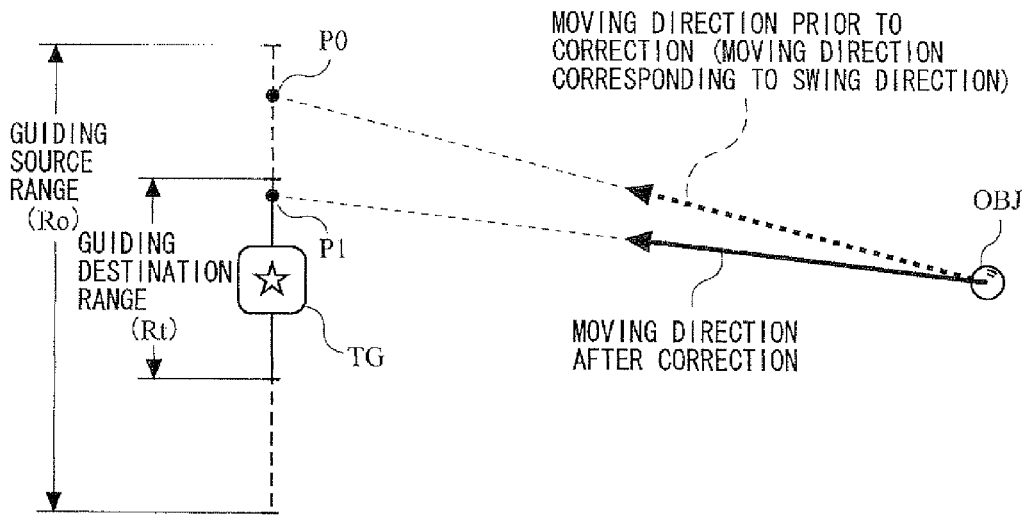
FIG. 10A is a diagram showing an exemplary case where a moving direction, which is set based on the swinging motion of the controller 7 only, is corrected.
Figure 10B:
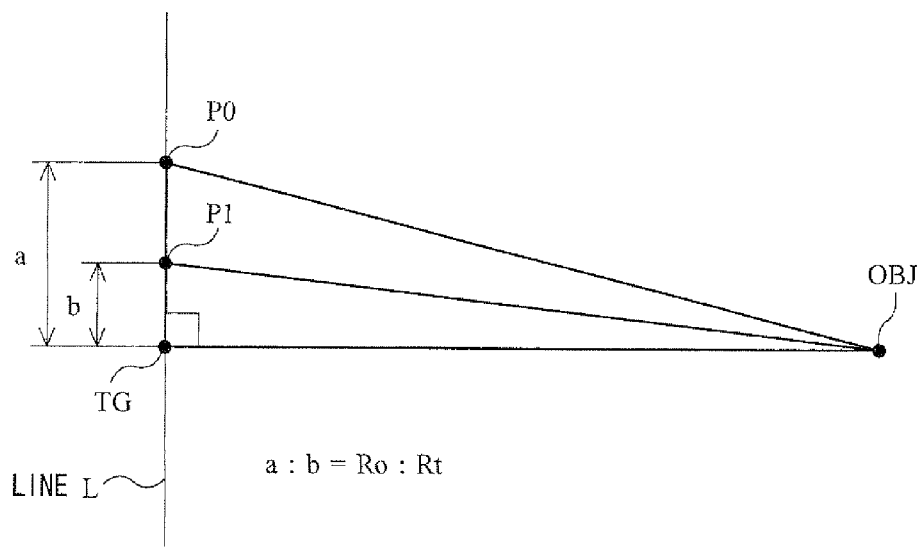
FIG. 10B is a diagram showing an exemplary case where the moving direction, which is set based on the swinging motion of the controller 7 only, is corrected.

Next, with reference to FIGS. 8 to 10, an outline of a game performed on the game apparatus body 5 will be described prior to describing specific processes performed by the game apparatus body 5. FIG. 8 is a diagram showing an exemplary game image displayed on the monitor 2. FIG. 9 is a diagram showing an example of a player object OBJ moving in accordance with a swinging motion of the controller 7 only. FIG. 10A and FIG. 10B are diagrams each showing an exemplary case where the moving direction, which is set based on the swinging motion of the controller 7 only, is corrected.

As shown in FIG. 8, the player object OBJ moving in a virtual game world is displayed on the monitor 2. FIG. 8 shows an exemplary game in which the player object OBJ moves in the right direction (a game progressing direction) in a two-dimensional virtual game world. For example, the virtual game world displayed on the monitor 2 is scrolled to the right at a predetermined speed, and the player object OBJ moves in the virtual game world displayed on the monitor 2. That is, the virtual camera moves to the left in the virtual game world, and the virtual game world displayed on the screen moves to the right. Accordingly, the game progresses to the left. The player causes the player object OBJ to hit a target TG appearing in the virtual game world, thereby scoring predetermined points.

The player object OBJ moves in the virtual game world in accordance with the direction in which the input device is swung. The above-described game may be progressed in accordance with the direction in which the unit-equipped controller 6 is swung, or may be progressed in accordance with the direction in which the controller 7 only is swung. Hereinafter, an example of a game progressing in accordance with the direction in which the controller 7 only is swung will be described.

In FIG. 9, in accordance with the controller 7 only swung from the right to the left in a real space, the player object OBJ moves from the right to the left in the virtual game world on the monitor 2. For example, acceleration, which is generated when the player swings the controller 7 only, is detected by the acceleration sensor 701, and data indicative of the acceleration is transmitted to the game apparatus body 5. In the game apparatus body 5, based on the received acceleration data, the direction in which the controller 7 only has been swung is calculated, and the moving direction of the player object OBJ is set in accordance with the calculated swing direction. At the time of setting the moving direction, the moving direction of the player object OBJ is corrected in the game apparatus body 5 such that the player object OBJ can easily hit the target TG, when the game is progressed in accordance with the direction in which the controller 7 only is swung. Hereinafter, the target TG with respect to which the moving direction of the player object OBJ is to be corrected may be referred to as a correction target TG.

In FIGS. 10A and 10B, a guiding source range and a guiding destination range are set with respect to the correction target TG. The guiding source range is used to determine whether or not the moving direction of the player object OBJ, the moving direction being set in the virtual game world in accordance with the direction in which the controller 7 only is swung, is to be corrected. When the set moving direction extends from a position of the player object OBJ at a current time point toward a position within the guiding source range from, the moving direction is to be corrected so as to be closer to the correction target TG which defines the guiding source range. For example, the guiding source range is set to have a range length Ro such that the range length Ro is parallel with a direction (straight line L) which is perpendicular to a direction extending from the player object OBJ toward the correction target TG, and that the correction target TG corresponds to the center of the range length Ro.

The guiding destination range is used to set a level of correction based on which the moving direction of the player object OBJ is corrected to be closer to the correction target TG. For example, the moving direction to-be-corrected is corrected so to be closer to the correction target TG in accordance with a ratio of guiding destination range to guiding source range.

Specifically, the guiding destination range is set to have a range length Rt (Rt<Ro) such that the range length Rt is parallel with the direction (straight line L) which is perpendicular to the direction extending from the player object OBJ toward the correction target TG, and that the correction target TG corresponds to the center of the range length Rt. In this case, the moving direction to-be-corrected is corrected so as to be closer to the correction target TG at a rate of Rt/Ro. Specifically, an intersection between the moving direction prior to correction and the straight line L is represented by a point P0, and a distance from the point P0 to the center of the correction target TG is represented by a distance a (a<Ro/2) In this case, in accordance with the distance a, a point P1 is set, which is located along the straight line L and distanced on the side of the point P0 from the center of the correction target TG by a distance b. The distance b is calculated based on an equation, b=a*Rt/Ro. The moving direction prior to correction from the position of the player object OBJ at the current time point toward the point P0 is then corrected to a direction from the position of the player object OBJ at the current time point toward the point P1.

As is clear from the above-described example of correcting the moving direction, a size of the guiding destination range (range length Rt) is set larger than that of the correction target TG. As a result, the moving direction after correction does not necessarily intersect with the correction target TG, and consequently, there is a possibility that the player object OBJ does not hit the correction target TG. That is, when the moving direction runs within the guiding source range, the moving direction is corrected so as to be closer to the correction target TG. However, the player object OBJ hits the correction target TG only in the case where the moving direction is close enough to the correction target TG. Therefore, even if the correction is performed, the correction target TG is not necessarily hit, and thus it is possible to prevent the game from being artificially too easy. The guiding source range is used to determine whether or not the moving direction is to be corrected. Therefore, it is possible to adjust a difficulty level of various games by changing the size of the guiding destination range (range length Rt) and/or the size of the guiding source range (range length Ro). When the difficulty level is to be lowered, a width of the guiding destination range is set to be equal to that of the correction target TG. Accordingly, as long as the moving direction is directed toward the guiding source range, the player object OBJ will definitely hit the correction target TG after the correction is performed.

Figure 11:
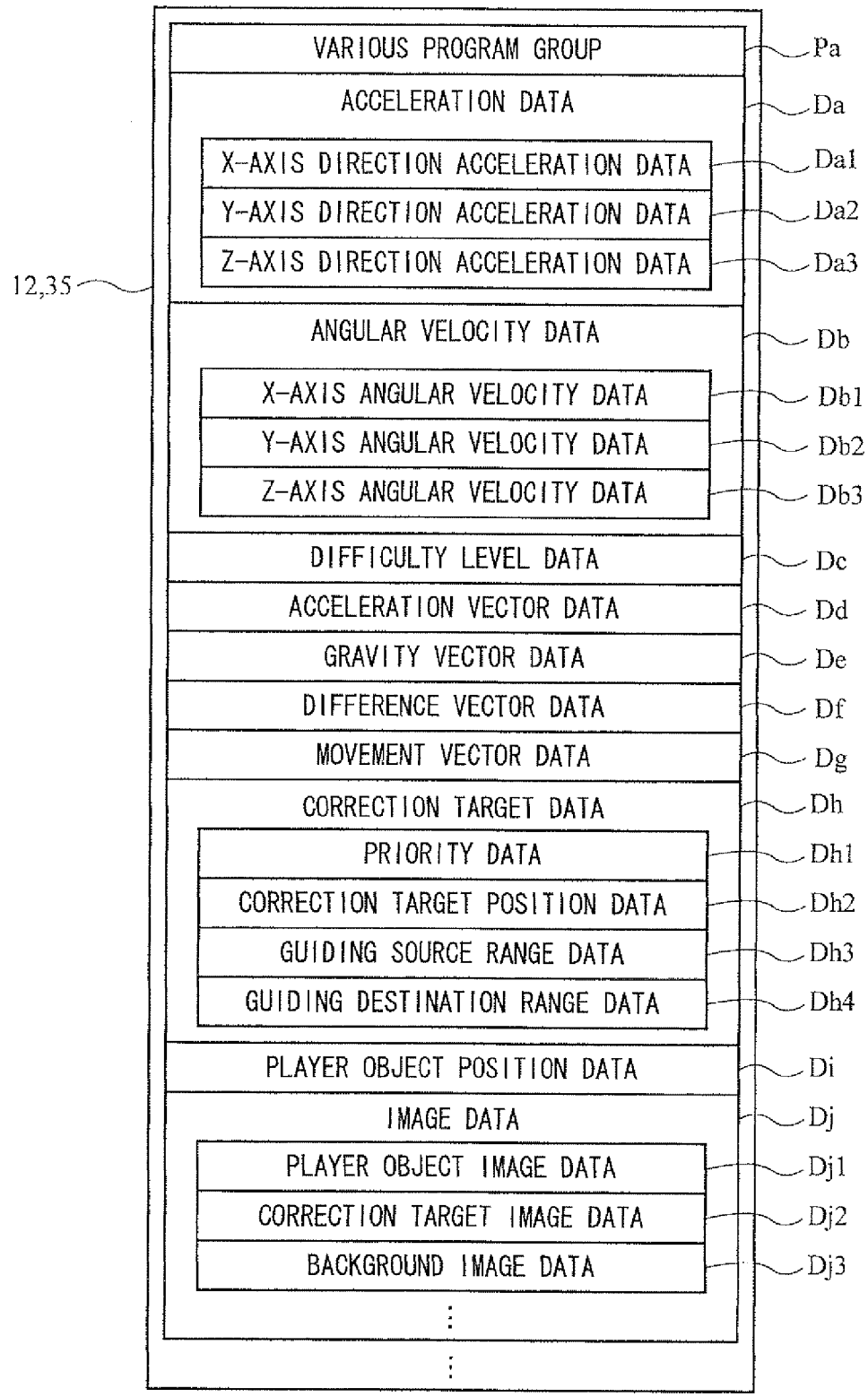
FIG. 11 is a diagram showing main pieces of data and programs stored in a main memory of a game apparatus body 5.

Next, the game process performed on the game system 1 will be described in detail. With reference to FIG. 11, major data used in the game process will be described. FIG. 11 is a diagram showing major data and programs stored in the external main memory 12 and/or the internal main memory 35 (hereinafter collectively referred to as main memory) of the game apparatus body 5.

As shown in FIG. 11, data storage area of the main memory has stored therein acceleration data Da, angular velocity data Pb, difficulty level data Dc, acceleration vector data Dd, gravity vector data De, difference vector data Df, movement vector data Dg, correction target data Dh, player object position data Di, image data Dj, and the like. The main memory stores therein data necessary for the game process such as data (e.g., position data) relating to other objects than the player object OBJ appearing on the game, and data relating to the virtual game world (e.g., background data), in addition to such data included in information shown in FIG. 11. Further, a program storage area of the main memory stores therein various programs Pa which configures the game program.

The acceleration data Da represents acceleration exerted on the controller 7, and has stored therein acceleration data included in the series of pieces of operation information transmitted from the controller 7 as the transmission data. The acceleration data Da includes: X-axis direction acceleration data Da1, which indicates an acceleration component detected along the X-axis direction by the acceleration sensor 701; Y-axis direction acceleration data Da2, which indicates an acceleration component detected along the Y-axis direction; and Z-axis direction acceleration data Da3, which indicates an acceleration component detected along the Z-axis direction.

The angular velocity data Db represents the angular velocities detected by the gyro sensors 95 and 96 of the angular velocity detection unit 9, and is stored in a manner to be correlated to the unit-equipped controller 6 to be used. For example, the angular velocity data Db is data indicative of the angular velocities applied to the unit-equipped controller 6 (gyro sensors 95 and 96), and has stored therein angular velocities included in the operation information transmitted, as the transmission data, from the unit-equipped controller 6. The angular velocity data Db includes therein X-axis angular velocity data Db1 indicative of an angular velocity v1 around the X-axis, Y-axis angular velocity data Db2 indicative of an angular velocity v2 around the Y-axis, and Z-axis angular velocity data Db3 indicative of an angular velocity v3 around the Z-axis, the angular velocities having been detected by the gyro sensors 95 and 96.

The wireless controller module 19 provided to the game apparatus body 5 receives the acceleration data and angular velocity data included in the operation information which is transmitted from the controller 7 having the angular velocity detection unit 9 mounted thereto in predetermined time cycles (e.g., 1/200 sec.), and stores the acceleration data in a buffer (not shown) of the wireless controller module 19. Thereafter, every frame period (e.g., 1/60 sec.), which corresponds to a game process cycle, the acceleration data and the angular velocity data stored in the buffer during the frame period are loaded, and the acceleration data Da and the angular velocity data Db in the main memory is updated.

Since a cycle of receiving the operation information is different from the data process cycle, a plurality pieces of the operation information received through a plurality of cycles is described in the buffer. In the game process to be described later, only a latest piece of operation information, among the plurality of pieces of operation information, is used in respective steps of the game process, and the steps are progressed successively.

In a process flow to be described later, an exemplary case will be used where the acceleration data Da and the angular velocity data Db are updated every frame period, namely, every game process cycle, respectively. However, the acceleration data Da and the angular velocity data Db may be updated in other process cycles. For example, the acceleration data Da and the angular velocity data Db are updated in every transmission cycle from the controller 7 having the angular velocity detector unit 9 mounted thereto, and the updated acceleration data Da and the angular velocity data Db may be used in every game process cycle. In this case, the cycle of updating the acceleration data Da1 to Da3 to be stored in the acceleration data Da and angular velocity data Db1 to Db3 to be stored in the angular velocity data Db is different from the game process cycle.

When the game apparatus body 5 is operated by using the controller 7 only, the angular velocity data is not included in the operation in formation. In this case, Null values may be stored in the angular velocity data Db1 to Db3.

Further, the angular velocity stored as appropriate in the angular velocity data Db may have been subjected to predetermined correction prior to the storage. Hereinafter, an example of correction of the angular velocity data will be described.

For example, an angular velocity v indicative of an angular velocity outputted from the gyro sensors 95 and 96 is processed with a primary correction by using the following assignment expression.

$$v \leftarrow v+(sum/ct-v) \times a$$

Wherein, ct indicates the number of pieces of data (consecutive number ct) of consecutive angular velocities which had been determined to stay within a stable range defined by a stable range (lower limit) s1 and a stable range (upper limit) s2 prior to the angular velocity v having been stored in a data buffer (not shown). Further, the sum indicates a total (sum) of values in the data buffers having angular velocities which had been determined to stay within the stable range. That is, consecutive data buffers having angular velocities which are included in the above-described stable range are obtained in reverse chronological order starting from the data buffer having the angular velocity v written therein, and the number (consecutive number ct) represents the number of the data buffers, and the total value (sum) represents the total of values of the data buffers (a maximum number of pieces to be searched is fixed). Further, "a" indicates a static condition value. The static condition value a stays within a range of 0 to 1, and when movement of the gyro sensors 95 and 96 is small (stable) for a longer period of time, the static condition value is closer to 1. When the consecutive number ct is equal to the above-described maximum number of pieces to be searched, that is, when respective values of consecutive data buffers prior to the data buffer having stored therein the angular velocity v are all within the stable range, and when the number of the consecutive data buffers is equal to the maximum number of pieces to be searched, the static condition value is normalized to be 1, i.e., a maximum value.

Offset correction is performed by subtracting a zero point offset value (output value in a static state) ofs from the angular velocity v having been subjected to the above-described primary correction. The zero point offset value ofs is a data value considered to be outputted when the gyro sensors 95 and 96 are in the static state, and is set to a predetermined device-specific value, however, the zero point offset value ofs is corrected and reset sequentially, in accordance with angular velocities v having been subjected to the primary correction.

Specifically, the zero point offset value ofs is corrected and reset based on the following assignment expression.

$$ofs \leftarrow ofs+(v-ofs) \times a \times C$$

Wherein, C is a constant, and satisfies C=0.01, for example. By setting the constant C at a small value, it is possible to prevent the angular velocity v from being corrected to an angular velocity (zero point) exerted when the unit-equipped controller 6 is in a static state. Further, drift phenomenon, which leads to deviation in the output value in the static state, does not show a radical change, and thus responsive correction is not required. Accordingly, by setting the constant C at a smaller value, it is possible to obtain a highly accurate zero point offset value ofs. Note that the value of the constant C may be changed in accordance with the type of a game using the unit-equipped controller 6. For example, when a value obtained by multiplying the static condition value a by the constant C is larger, that is, when the movement of the unit-equipped controller 6 is small and stable for a longer period of time, the zero point offset value ofs is corrected to be closer to the angular velocity v having been subjected to the primary correction. Therefore, when the unit-equipped controller 6 is in a static state, it is highly likely that the zero point offset value ofs becomes close to the angular velocity v having been subjected to the primary correction. That is, when the angular velocity hardly changes as in the case where the gyro sensors 95 and 96 are in a static state, the zero point is corrected so as to become closer to an average value.

The angular velocity v having been subjected to the primary correction is offset-corrected by using the zero point offset value ofs. For example, the angular velocity having been subjected to the primary correction is offset-corrected based on the following assignment expression.

$$v \leftarrow v-ofs$$

Accordingly, the angular velocity v indicated by the angular velocity outputted from the gyro sensors 95 and 96 is again corrected after consideration of the zero point (output value in the static state). Then, by using the angular velocity having been subjected to the offset correction, the angular velocity data Db is updated appropriately. The angular velocity stored in the angular velocity data Db appropriately may be such an angular velocity that has not been subjected to the primary correction, but has been subjected to the offset correction only. Further, only the offset correction may be performed by using a fixed value as the zero point offset value ofs.

The difficulty level data Dc has stored therein data indicative of a difficulty level of a game, the level being set in accordance with a mode of the input device (the controller 7 only or the unit-equipped controller 6) operated by a player. Specifically, in accordance with a motion applied to the input device operated by the player, the difficulty level is set different between a case where the acceleration data and the angular velocity data are obtained, and a case where the angular velocity data is not obtained (that is, only the acceleration data is obtained). Data indicative of the difficulty level is stored in the difficulty level data Dc. Details will be clearly described later.

The acceleration vector data Dd is data indicative of an acceleration vector which is calculated by using acceleration indicated by the X-axis direction acceleration data Da1, the Y-axis direction acceleration data Da2, and the Z-axis direction acceleration data Da3. The acceleration vector data Dd has stored therein a direction and magnitude of the acceleration exerted on the controller 7 (unit-equipped controller 6). The gravity vector data De has stored therein a gravity vector indicative of a direction and magnitude of the gravity exerted on the controller 7 (unit-equipped controller 6). The difference vector data Df has stored therein a vector (difference vector) which is obtained by subtracting the gravity vector from an acceleration vector. The movement vector data Dg has stored therein data (a movement vector) indicative of the moving direction and a moving speed of the player object OBJ, which are set in the virtual game world in accordance with the difference vector.

The correction target data Dh includes priority data Dh1, correction target position data Dh2, guiding source range data Dh3, and guiding destination range data Dh4 for each of the correction targets TG, and has stored therein data indicative of various information about each of the correction targets TG. The priority data Dh1 indicates priority for determining whether or not the moving direction of the player object OBJ with respect to each correction target TG is to be corrected. The correction target position data Dh2 indicates a position of the correction target TG allocated in the virtual game world. The guiding source range data Dh3 indicates the guiding source range set to be centered on the correction target TG. The guiding destination range data Dh4 indicates the guiding destination range set to be centered on the correction target TG.

Player object position data Di has stored therein data indicative of a position of the player object OBJ allocated in the virtual game world.

The image data Dj includes player object image data Dj1, correction target image data Dj2, background image data Dj3, and the like. The player object image data Dj1 is used to allocate the player object OBJ in the virtual game world and to generate a game image thereof. The correction target image data Dj2 is used to allocate the correction target TG in the virtual game world and to generate a game image thereof. The background image data Dj3 is used to allocate a background image in the virtual game world and to generate a game image thereof.

Figure 12:
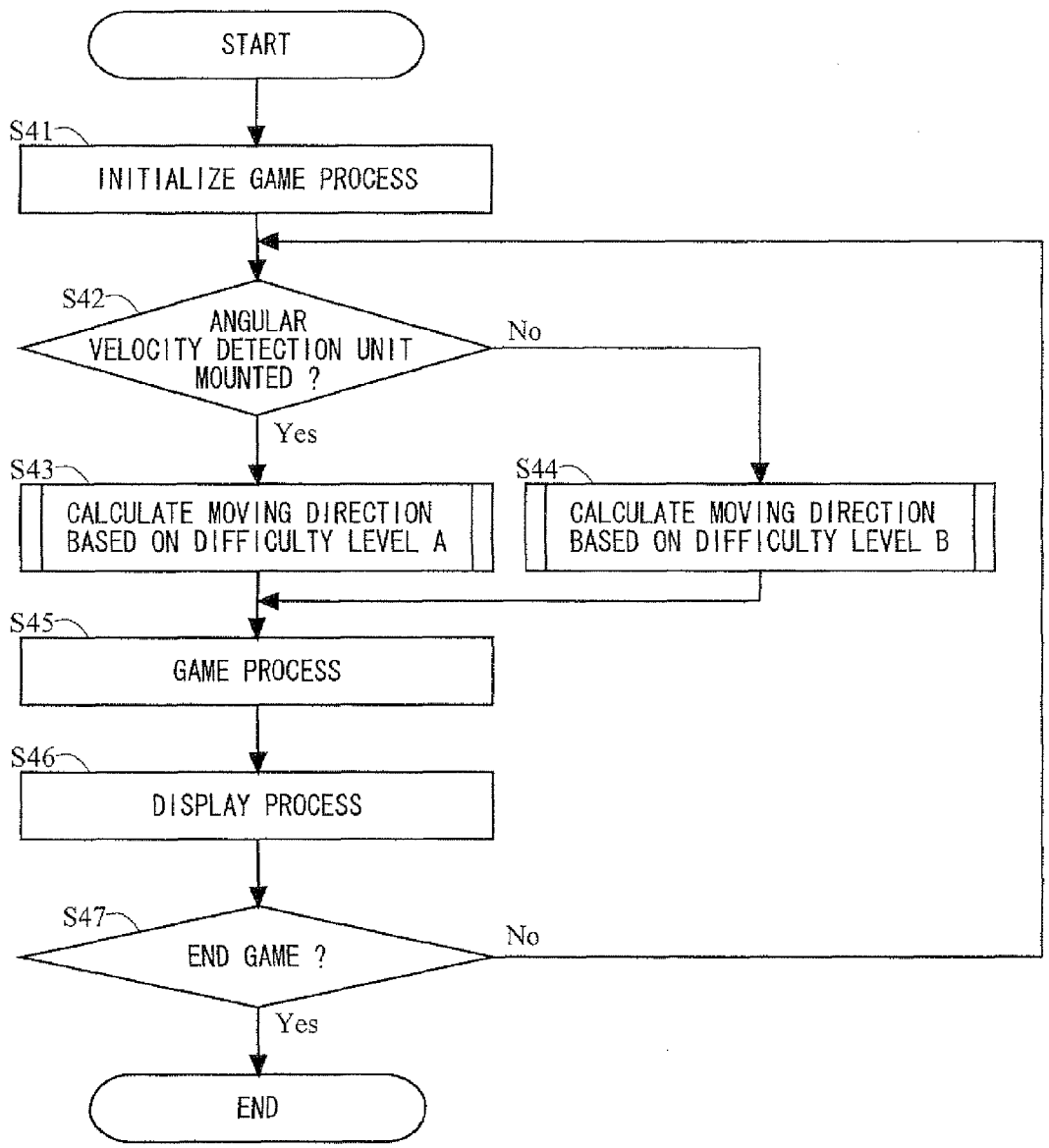
FIG. 12 is a flowchart showing an example of an operation of a game process executed on the game apparatus body 5.
Figure 13:
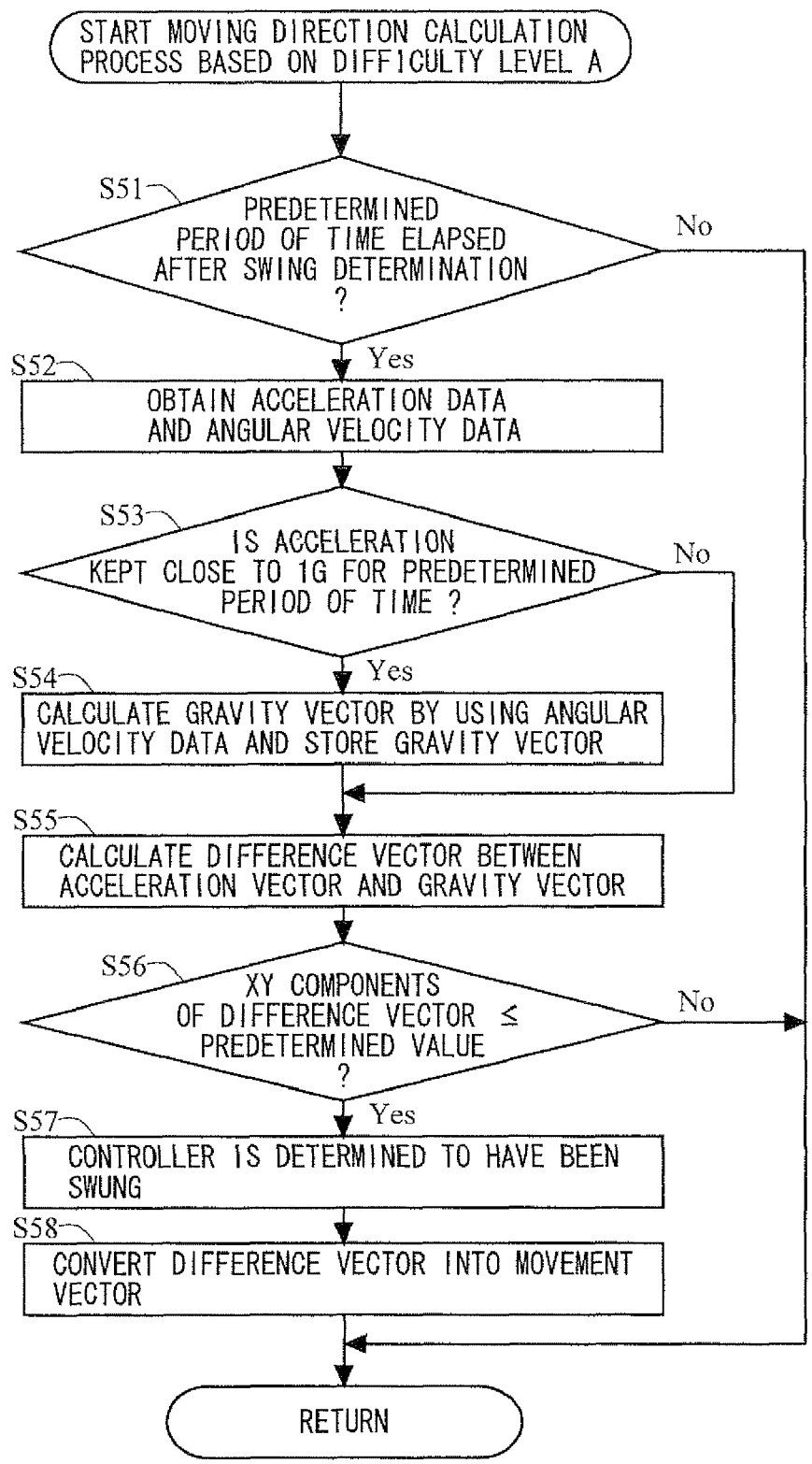
FIG. 13 is a subroutine showing, in detail, an exemplary operation of a moving direction calculation process in step 43 shown in FIG. 12, based on a difficulty level A.
Figure 14:
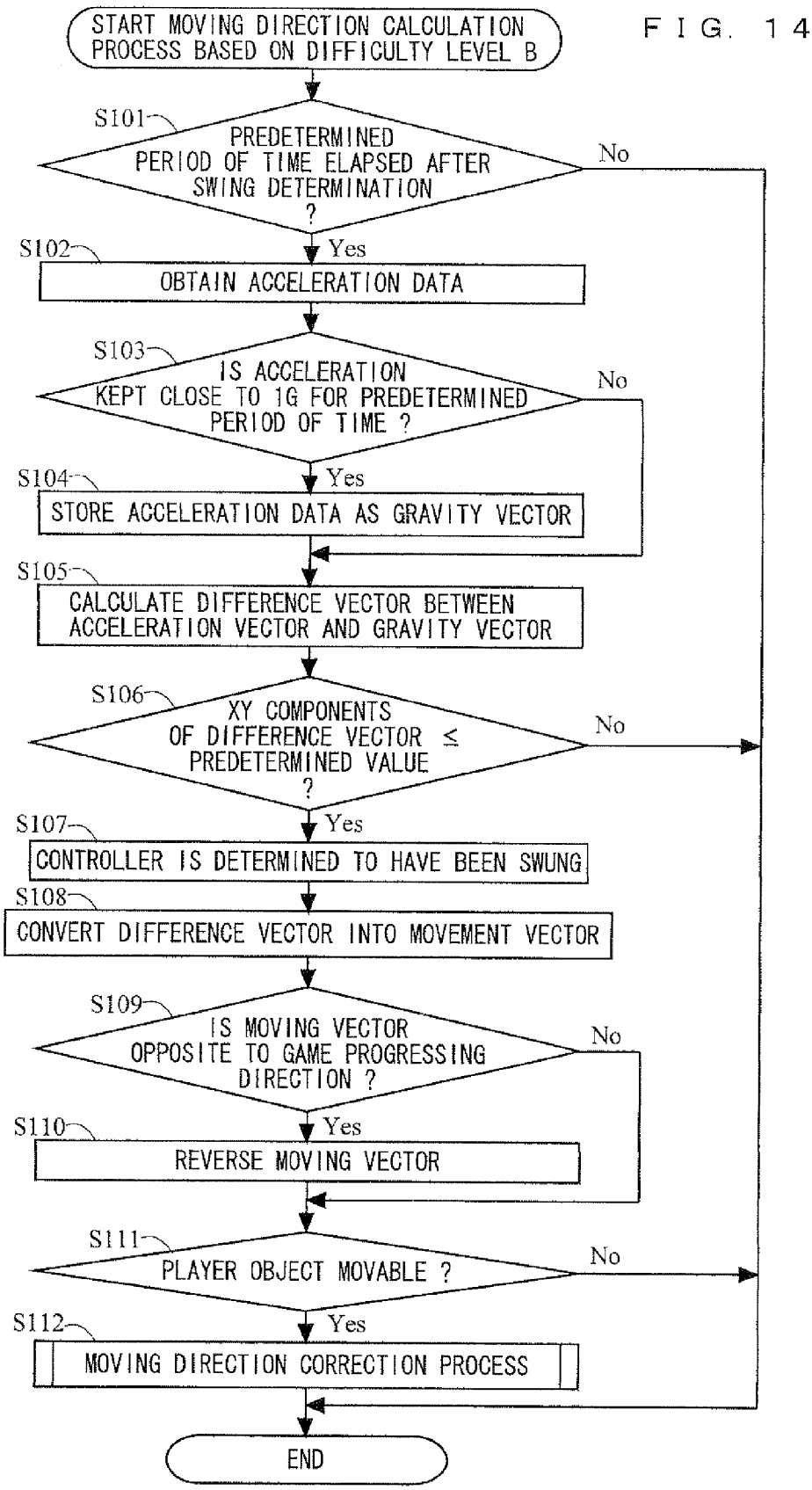
FIG. 14 is a subroutine showing, in detail, an exemplary operation of a moving direction calculation process in step 44 shown in FIG. 12, based on a difficulty level B.
Figure 15:
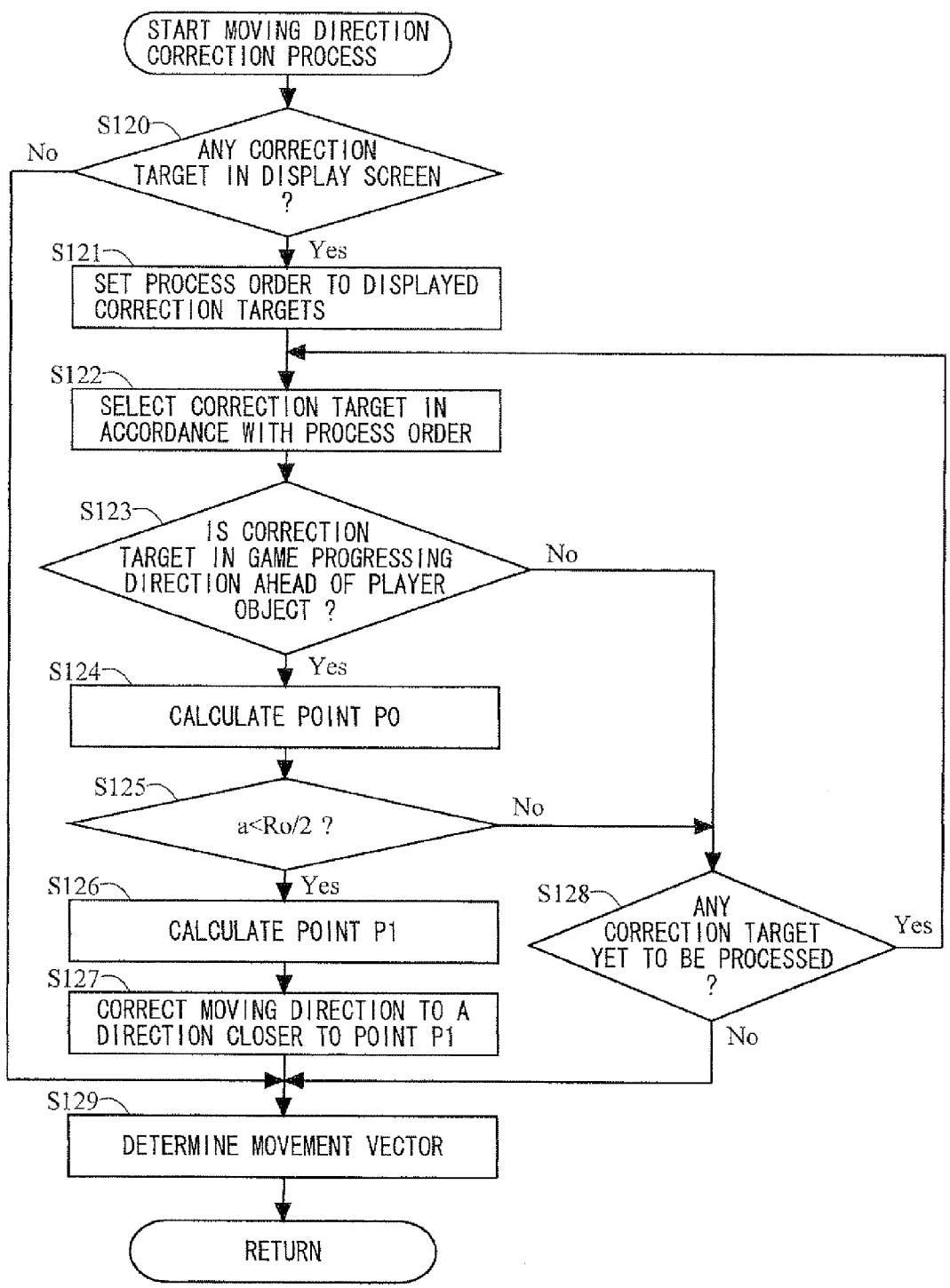
FIG. 15 is a subroutine showing, in detail, an exemplary operation of a moving direction correction process in step 112 shown in FIG. 14.

Next, with reference to FIG. 12 to FIG. 15, the game process performed on the game apparatus body 5 will be described in detail. FIG. 12 is a flowchart showing an example of an operation of the game process executed on the game apparatus body 5. FIG. 13 is a subroutine showing, in detail, an exemplary operation of a moving direction calculation process in step 43 shown in FIG. 12, based on a difficulty level A. FIG. 14 is a subroutine showing, in detail, an exemplary operation of a moving direction calculation process in step 44 shown in FIG. 12, based on a difficulty level B. FIG. 15 is a subroutine showing, in detail, an exemplary operation of a moving direction correction process in step 112 shown in FIG. 14. In the flowchart shown in each of FIGS. 12 to 15, processes which cause the player object OBJ to move in accordance with the controller 7 only or the unit-equipped controller 6 swung by a player will be mainly described. Description of other processes in the game process, which are not directly related to the prevent invention, will be omitted. Further, in FIGS. 12 to 15, respective steps executed by the CPU 10 are abbreviated as "S".

When the power of the game apparatus body 5 is turned on, the CPU 10 of the game apparatus body 5 executes the boot-up program stored in the ROM/RTC 13, thereby initializing respective units such as the main memory. A game program stored in the optical disc 4 is loaded into the main memory, and the CPU 10 starts executing the game program. The flowchart shown in each of FIGS. 12 to 15 shows a game process to be performed after completion of the above-described process.

In FIG. 12, the CPU 10 initializes the game process (step 41), and advances the processing to the subsequent step. For example, in initialization of the game process in step 41, setting of the virtual game world, and positions of the player object OBJ, the correction target TG, and other targets than the correction target are initialized. Further, in the initialization of the game process in step 41, respective parameters to be used in the game process performed thereafter are also initialized. For example, the CPU 10 sets respective parameters indicated by respective pieces of data Da to Dg, which are stored in the main memory, to 0. Further, in the initialization of the game process in step 41, a game progressing direction is set in the virtual game world displayed on the monitor 2 (see FIG. 8). For example, any one of a left direction, a right direction, an upper direction, and a lower direction of the monitor 2 is set as the game progressing direction. When the left direction is set as the game progressing direction, it may be difficult for such a player that holds the controller 7 only or the unit-equipped controller 6 with the left hand (a left-handed player) to play the game. Further, when the right direction is set as the game progressing direction, it may be difficult for such a player that holds the controller 7 only or the unit-equipped controller 6 with the right hand (a right-handed player) to play the game. In order to avoid advantage/disadvantage depending on hand dominance, the game progressing direction may be set in accordance with the hand dominance of a player registered in advance.

Next, the CPU 10 determines whether or not the angular velocity detection unit 9 is mounted to the input device used by a player (step 42). As an example, the CPU 10 refers to data which is included in the operation information transmitted from the controller 7 and which indicates whether or not the angular velocity detection unit 9 is mounted to the controller 7, and determines whether or not the angular velocity detection unit 9 is mounted to the input device used by the player. As another example, the CPU 10 determines whether or not the angular velocity detection unit 9 is mounted to the input device used by the player, based on whether or not the angular velocities around the X-axis, Y-axis, and Z-axis are included in the operation information transmitted from the controller 7. When the angular velocity detection unit 9 is mounted to the input device used by the player (that is, when the player uses the unit-equipped controller 6), the CPU 10 sets the difficulty level to A, updates the difficulty level data Dc, and advances the processing to step 43 subsequently. On the other hand, when the angular velocity detection unit 9 is not mounted to the input device used by the player (that is, when the player uses the controller 7 only), the CPU 10 sets the difficulty level to B, updates the difficulty level data Dc, and advances the processing to step 44 subsequently.

In step 43, CPU 10 performs a process of calculating a moving direction, based on the difficulty level A, and advances the processing to step 45 subsequently. Hereinafter, with reference to FIG. 13, the process of calculating the moving direction based on the difficulty level A will be described. As is clear from the process in above step 42, the process of calculating the moving direction based on the difficulty level A corresponds to a process of calculating a moving direction performed in the game process when the player performs an operation by using the unit-equipped controller 6.

In FIG. 13, the CPU 10 determines whether or not elapsed time, after the unit-equipped controller 6 is determined to have been swung, reaches a predetermined time (step 51). As will be clarified later, the CPU 10 determines in step 57 that the unit-equipped controller 6 has been swung, and counts the elapsed time after the process in the step. The CPU 10 then determines whether or not the elapsed time reaches the predetermined time. When the elapsed time has reached the predetermined time, the CPU 10 advances the processing to step 52 subsequently. On the other hand, when the elapsed time is yet to reach the predetermined time, the CPU 10 ends the processing of the subroutine.

The process in above step 51 is to delay a subsequent swing determination after a swing determination of the unit-equipped controller 6 for a period of time until a swing direction obtained based on the swing determination is reflected onto the movement of the player object PO. For example, when the unit-equipped controller 6 is determined to have been swung and the unit-equipped controller 6 is swung again before the direction of the first swing is reflected onto the movement of the player object PO, there is a possibility that the movement of the player object PO in accordance with the first swing operation will not be performed. In the present embodiment, for a predetermined period of time after the unit-equipped controller 6 is determined to have been swung, the subsequent swung determination will not be performed, whereby the swing operation performed by the player is reflected onto the movement of the player object PO in an ensured manner.

In step 52, CPU 10 obtains data indicative of acceleration and data indicative of angular velocities from the unit-equipped controller 6, and advances the processing to the subsequent step. For example, the CPU 10 obtains the operation information received from the unit-equipped controller 6, and stores the acceleration indicated by most recent acceleration data and the angular velocities indicated by most recent angular velocity data, which are included in the operation information, in the acceleration data Da and the angular velocity data Db, respectively. Specifically, the CPU 10 updates the X-axis direction acceleration data Da1 by using acceleration indicated by the X-axis direction acceleration data included in the most recent operation information received from the unit-equipped controller 6. The CPU 10 also updates the Y-axis direction acceleration data Da2 by using acceleration indicated by the Y-axis direction acceleration data included in the most recent operation information. The CPU 10 then updates the Z-axis direction acceleration data Da3 by using acceleration indicated by the Z-axis direction acceleration data included in the most recent operation information. Further, the CPU 10 updates the X-axis angular velocity data Db1 by using an angular velocity indicated by the X-axis angular velocity data included in the most recent operation information received from the unit-equipped controller 6. The CPU 10 also updates the Y-axis angular velocity data Db2 by using an angular velocity indicated by the Y-axis angular velocity data included in the most recent operation information. The CPU 10 then updates the Z-axis angular velocity data Db3 by using an angular velocity indicated by the Z-axis angular velocity included in the most recent operation information.

Next, the CPU 10 calculates an acceleration vector and determines whether or not the magnitude of the acceleration vector data is kept close to 1 G($\approx$9.8 m/s$^2$) for a certain period of time (step 53). For example, the CPU 10 uses the X-axis direction acceleration stored in the X-axis direction acceleration data Da1, the Y-axis direction acceleration stored in the Y-axis direction acceleration data Da2, and the Z-axis acceleration stored in the Z-axis direction acceleration data Da3, calculates an acceleration vector including the acceleration components along the respective directions, and then updates the acceleration vector data Dd by using the acceleration vector. The CPU 10 determines whether or not a state where the magnitude of the acceleration vector is close to 1.0 G (e.g., 1.0 G±10%) is kept for a predetermined period of time (e.g., 0.1 secs.). When the state where the magnitude of the acceleration vector is kept close to 1 G for the predetermined period of timer the CPU 10 advances the processing to step 54 subsequently. On the other hand, when the state where the magnitude of the acceleration vector is not kept close to 1 G for the predetermined period of timer the CPU 10 advances the processing to step 55 subsequently.

in step 54, the CPU 10 sets a gravity vector by using the angular velocity data, and advances the processing to step 55 subsequently. For example, the CPU 10 calculates an attitude of the unit-equipped controller 6 by using angular velocities indicated by the angular velocity data Db, corrects the attitude of the unit-equipped controller 6 in accordance with acceleration indicated by the acceleration data Da, calculates gravitational acceleration (a gravity vector) applied to the unit-equipped controller 6, and then updates the gravity vector data De by using the calculated gravity vector. Hereinafter, an exemplary calculation of the gravity vector will be described.

In above step 54, the CPU 10 calculates the attitude of the unit-equipped controller 6 based on the angular velocities indicated by the angular velocity data Db. Any method may be used as a method for calculating, based on the angular velocities, the attitude of the unit-equipped controller 6. For example, as a method for calculating the attitude of the unit-equipped controller 6, based the angular velocity, there is a method in which angular velocities (per unit time) is successively added to an initial attitude of the unit-equipped controller 6. That is, the angular velocities successively outputted from the gyro sensors 95 and 96 are integrated, and an amount of change in the attitude from the initial attitude is calculated from a result of the integration, whereby it is possible to calculate a current attitude (hereinafter referred to as a first attitude) of the unit-equipped controller 6.

Next, the CPU 10 corrects the first attitude in accordance with the acceleration indicated by the acceleration data Da. For example, the CPU 10 performs correction so as to approximate the first attitude to a second attitude. The second attitude indicates the attitude of the unit-equipped controller 6 determined based on the acceleration indicated by the acceleration data Da, and specifically indicates the attitude of the unit-equipped controller 6 in the case where the direction of the acceleration is assumed to be oriented vertically downward. That is, the second attitude is the attitude calculated based on the assumption that the acceleration is the gravitational acceleration. In the following description, the above-described first attitude represents a direction of the gravitational acceleration which is assumed to be applied to the unit-equipped controller 6, based on the angular velocities indicated by the angular velocity data Db, and the first attitude is indicated by using an XYZ-axis coordinate system defined with respect to the unit-equipped controller 6. Further, the second attitude also represents the direction of the gravitational acceleration applied to the unit-equipped controller 6, while the direction of the acceleration indicated by the acceleration data Da is regarded as direction of the gravitational acceleration, and the second attitude is indicated by using the same XYZ-axis coordinate system.

Here, when the first attitude obtained from the angular velocities indicated by the angular velocity data Db is not calculated properly, or when the acceleration indicated by the acceleration data Da does not indicate the direction of gravity accurately, the direction of the gravitational acceleration assumed based on the first attitude is different from the direction of the gravitational acceleration indicated by the second attitude. Under a condition where the direction of the acceleration indicated by the acceleration data Da corresponds to the direction of gravity, for example, when the unit-equipped controller 6 is in a static state, the direction of the gravitational acceleration indicated by the second attitude is regarded as accurate data corresponding to the attitude of the unit-equipped controller 6. Even if the unit-equipped controller 6 is not in a static state, when accuracy of an average attitude during a certain period of time is taken into consideration, the direction of the gravitational acceleration indicated by the second attitude is generally closer to the direction of gravity, and thus is considered to be more reliable than the first attitude calculated based on the angular velocities which includes errors being accumulated over time. On the other hand, when the attitude of the unit-equipped controller 6 is calculated accurately at the most recent calculation timing, it is considered that use of the angular velocity instead of the acceleration enables more accurate calculation of the attitude of the unit-equipped controller 6 at the subsequent calculation timing. That is, the attitude calculation based on the angular velocity causes a smaller error at each calculation timing than the calculation based on the acceleration. However, the error increases over time, when the angular velocity is used. On the other hand, the attitude calculation based on the acceleration may cause a larger error at each calculation timing, however, the error will not be accumulated since the attitude can be based on each calculation.

Therefore, in step 54, correction is performed while both of the first attitude and the second attitude are taken into consideration. Specifically, the CPU 10 performs correction by approximating the first attitude to the second attitude by a predetermined angle. As an example, the degree of approximation of the first attitude to the second attitude is determined such that the degree of approximation changes based on the magnitude of the acceleration indicated by the acceleration data Da (more specifically, a difference between the magnitude of the acceleration and the magnitude of the gravitational acceleration). As another example, the degree of approximation of the first attitude to the second attitude is set to a predetermined fixed value. Accordingly, even if the acceleration indicated by the acceleration data Da changes drastically due to erroneous detection, intense operation, or the like, the corrected first attitude will not change drastically.

The CPU 10 then calculates the gravity vector, which has the magnitude of 1.0 G and indicates the direction of the gravitational acceleration assumed to be applied to the unit-equipped controller 6 in accordance with the corrected first attitude in the XYZ-axis coordinate system defined with respect to the unit-equipped controller 6, and updates the gravity vector data De by using the calculated gravity vector.

In step 55, the CPU 10 calculates a difference vector by subtracting the gravity vector from the acceleration vector, and advances the processing to the subsequent step. For example, the CPU 10 refers to the acceleration vector data Dd and the gravity vector data De, calculates the difference vector by subtracting the gravity vector indicated by the gravity vector data De from the acceleration vector indicated by the acceleration vector data Dd, and updates the difference vector data Df by using the calculated difference vector.

Next, the CPU 10 determines whether or not the magnitude of X-axis and Y-axis components of the difference vector excluding a Z-axis component is equal to or greater than a predetermined value (step 56). The predetermined value is a threshold for determining whether or not the unit-equipped controller 6 is swung by the player, and is set larger than the gravitational acceleration (i.e., 1.0 G) applied to the unit-equipped controller 6 even in a static state. The Z-axis component of the difference vector will become extremely larger than other axis components (X-axis and Y-axis components) due to a centrifugal force caused by swinging of the unit-equipped controller 6, and thus, in the present embodiment, whether or not the unit-equipped controller 6 is swung is determined while the Z-axis component is excluded. When the magnitude of the X-axis and Y-axis components of the difference vector is equal to or greater than the predetermined value, the CPU 10 advances the processing to step 57 subsequently. On the other hand, when the magnitude of the X-axis and Y-axis components of the difference vector is smaller than the predetermined value, the CPU 10 ends the processing of the subroutine.

In step 57, the CPU 10 determines that the unit-equipped controller 6 has been swung, and starts counting elapsed time after the determination. The CPU 10 then advances the processing to the subsequent step.

Next, the CPU 10 converts the difference vector at a current time point into a movement vector in a virtual game world (step S8), and ends the processing of the subroutine. For example, the CPU 10 refers to the difference vector data Df, converts the difference vector indicated by the difference vector data Df into the movement vector, and updates movement vector data Dg by using the movement vector. Hereinafter, an exemplary conversion of the difference vector into the movement vector will be described.

Figure 16A:
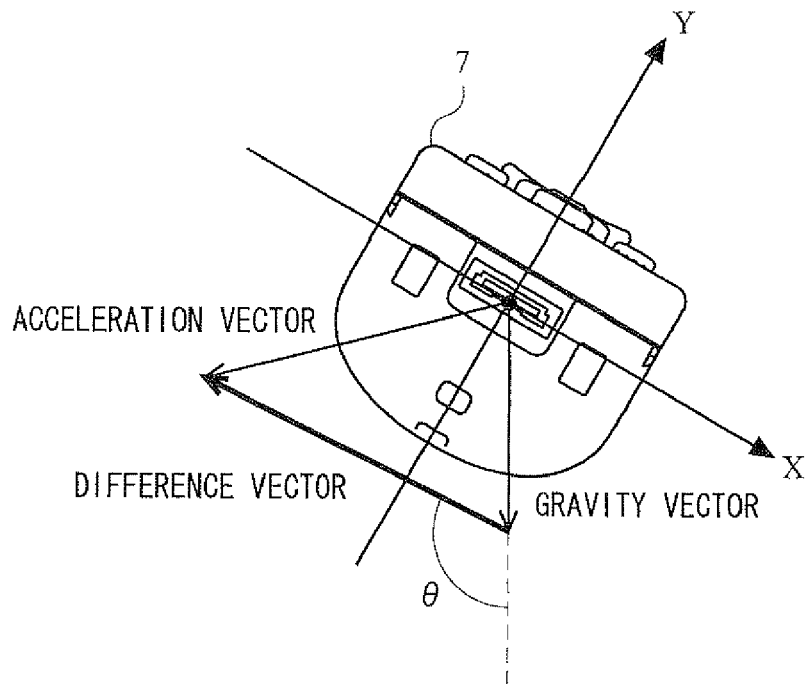
FIG. 16A is a schematic diagram showing an example of difference vector calculation.

FIG. 16A is a diagram showing the unit-equipped controller 6 as viewed from a rear side thereof. As shown in FIG. 16, in above described step 55, the difference vector is calculated by subtracting the gravity vector from the acceleration vector. As above described, the gravity vector indicates the direction and magnitude of the gravitational acceleration applied to the unit-equipped controller 6. On the other hand, the acceleration vector to be detected is a combination of acceleration caused by a movement (e.g., swinging) of the unit-equipped controller 6 with the above-described gravitational acceleration. Therefore, the difference vector may be regarded as data indicative of the direction and magnitude of the acceleration caused by the movement of the unit-equipped controller 6.

An angle formed between the direction of the gravity vector and the direction of the difference vector may be used as a parameter indicative of a direction of the acceleration which is caused by the movement of the unit-equipped controller 6 and is based the direction of the gravitational acceleration. In an exemplary game to be described later, since a two-dimensional virtual game world is applied, the Z-axis component of the gravity vector and the Z-axis component of the difference vector are each set to 0, and an angle θ formed between the direction of the gravity vector and the direction of the difference vector is calculated.

Figure 16B:
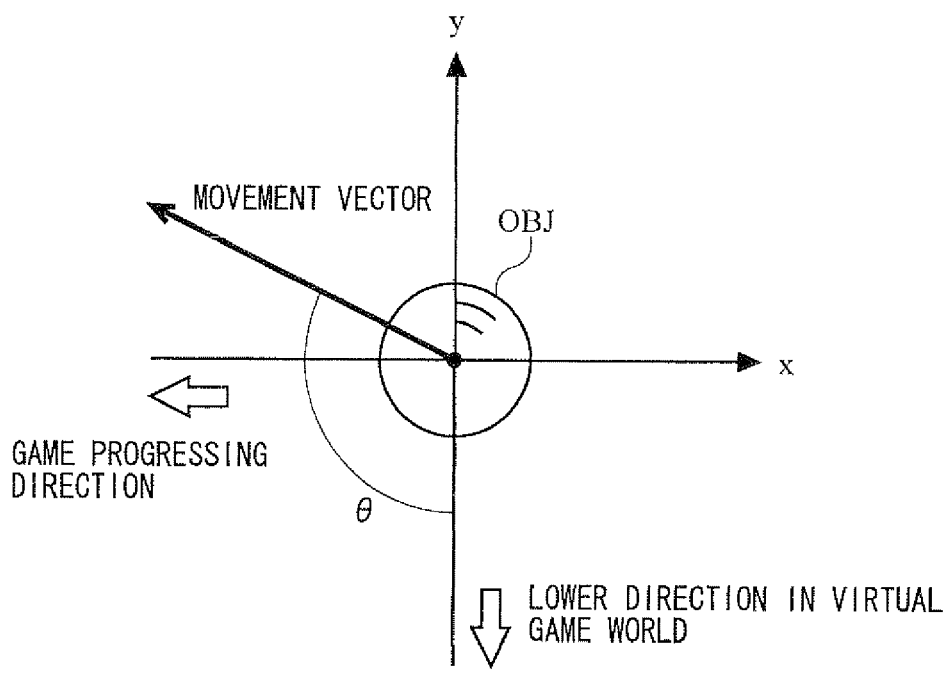
FIG. 16B is a schematic diagram showing an example of movement vector calculation.

On the other hand, on the monitor 2, a two-dimensional virtual game world is displayed, for example. For the sake of making the following description specific, a coordinate system set with respect to the virtual game world will be defined. As shown in FIG. 16B, an x-axis and a y-axis which are perpendicular to each other are defined on the two-dimensional virtual game world.

Specifically, a left-right direction in the virtual game world is defined as the x-axis, and a right side in the virtual game world on the monitor 2 is defined as an x-axis positive direction. Further, an up-down direction in the virtual game world is defined as a y-axis, and the up direction in the virtual game world on the monitor 2 is defined as a y-axis positive direction.

When the difference vector is converted into the movement vector, a vector is set by replacing the X-axis component and the Y-axis component of the difference vector with an X-axis component and a Y-axis component in the virtual game world. The direction of the vector is rotated so as to form an angle θ between the direction of the vector and the downward direction (that is, the Y-axis negative direction) in the virtual game world, whereby the movement vector in the virtual game world is set. The magnitude of the movement vector may be set based on an operating environment of a game, or an operational intuition. For example, the magnitude may be set by multiplying the magnitude of the difference vector by a predetermined rate.

With reference back to FIG. 12, in step 44, the CPU 10 performs a process of calculating the moving direction based on the difficulty level B, and advances the processing to subsequent step 45. Hereinafter, with reference to FIG. 14, the process of calculating the moving direction based on the difficulty level B will be described. As is clear from the process in above step 42, the process of calculating the moving direction based on the difficulty level B corresponds to a process of calculating a moving direction performed in a game process when the player operates the controller 7 only.

In FIG. 14, the CPU 10 determines whether or not elapsed time, after the controller 7 only is determined to have been swung, reaches a predetermined time (step 101). As will be clear later, the CPU 10 determines in step 107 that the controller 7 only is swung, and counts the elapsed time after the process in the step. The CPU 10 then determines whether or not the elapsed time reaches predetermined time (e.g., 0.3 sec.). When the elapsed time reaches the predetermined time, the CPU 10 advances the processing to step 102 subsequently. On the other hand, when the elapsed time is yet to reach the predetermined time, the CPU 10 ends the processing of the subroutine.

The process in step 101 is performed to delay subsequent swing determination for a period of time until an obtained swing direction is reflected onto the movement of the player object P0, and also performed to prevent erroneous determination from occurring after swinging of the controller 7 only has been determined. For example, it is highly likely that the acceleration exerted on the controller 7 only immediately after the controller 7 only is determined to have been swung is identical with acceleration in an opposite direction which is applied to stop swinging the controller 7 only, or identical with acceleration which occurs when a player swings the controller 7 only toward a direction opposite to a back swing action, which is performed immediately after the back swing action. That is, during a series of swinging actions, the acceleration in the opposite direction may occur, and if the acceleration including that occurring in the opposite direction is used for swing determination, it becomes difficult to determine the direction in which the controller 7 only is actually swung. In the present embodiment, acceleration which occurs for a given period of time (e.g., 0.3 sec.) after the controller 7 only is determined to have been swung is not used for subsequent swing determination. Accordingly, it is possible to prevent the acceleration occurring in the direction opposite to the acceleration, which is used for a most recent swing determination, from being used for subsequent swing determination.

The predetermined period of time used in above step 101 may be longer than or equal to the predetermined period of time used for determination in step 51. For example, in the process in above-described step 51, the acceleration and the angular velocities applied to the unit-equipped controller 6 is used to calculate the attitude of the unit-equipped controller 6, and thus accuracy in calculating the attitude is relatively high, and erroneous determination after the above-described swing determination hardly occurs. Therefore, for determination in step 51, only the time required for reflecting the obtained swing direction onto the movement of the player object PO needs to be considered. In this case, the predetermined time used for determination in step 51 may be set shorter than the predetermined time used for determination in step 101. However, if the erroneous determination after the swing determination needs to be taken into consideration in the determination in above step 51, the predetermined time used for determination in step 51 may be set equal (e.g., 0.3 secs.) to the predetermined time used for determination in step 101.

In step 102, the CPU 10 obtains acceleration data from the controller 7 only, and advances the processing to the subsequent step. For example, the CPU 10 obtains the operation information received from the controller 7 only, and stores, in the acceleration data Da, acceleration indicated by most recent acceleration data included in the operation information. Specifically, the CPU 10 updates the X-axis direction acceleration data Da1 with the acceleration indicated by the X-axis direction acceleration data which is included in the most recent operation information received from the controller 7 only. Further, the CPU 10 updates the Y-axis direction acceleration data Da2 with the acceleration indicated by the Y-axis direction acceleration data which is included in the most recent operation information. Still further, the CPU 10 updates the Z-axis direction acceleration data Da3 with the acceleration indicated by the Z-axis direction acceleration data which is included in the most recent operation information. When the player operates the controller 7 only, the angular velocity data is not included in the received operation information since the angular velocity detection unit 9 is not mounted. In this case, the CPU 10 stores Null values in the angular velocity data Db1 to Db3.

Next, the CPU 10 calculates an acceleration vector, updates the acceleration vector data Dd, and determines whether or not the magnitude of the acceleration vector is kept close to 1 G for a predetermined period of time (step 103). When the magnitude of the acceleration vector data is kept close to 1 G for the predetermined period of time, the CPU 10 advances the processing to step 104 subsequently. On the other hand, when the magnitude of the acceleration vector data is not kept close to 10 for the predetermined period of time, the CPU 10 advances the processing to step 105 subsequently. Since the process in step 103 is the same as the process in step 53, detailed description will be omitted.

In step 104, the CPU 10 sets an acceleration vector at a current time point as the gravity vector, and advances the processing to step 105 subsequently. For example, the CPU 10 refers to the acceleration vector data Dd, and updates the gravity vector data De using the acceleration vector indicated by the acceleration vector data Dd. Here, above-described step 104 is executed when the magnitude of the acceleration vector is kept close to 1.0 G for a predetermined period of time. That is, step 104 is executed when the magnitude of the acceleration exerted on the controller 7 only is stable at around 1.0 G, and accordingly, it is assumed that the controller 7 only is in a static state. Therefore, the acceleration exerted on the controller 7 only, which is in a static state, is assumed to be the gravity acceleration. Accordingly, the acceleration vector detected in the above-described state can be regarded as a vector (gravity vector) of the gravity acceleration exerted on the controller 7 only.

In step 105, the CPU 10 calculates the difference vector by subtracting the gravity vector from the acceleration vector, and advances the processing to the subsequent step. For example, with reference to the acceleration vector data Dd and the gravity vector data De, the CPU 10 calculates the difference vector by subtracting the gravity vector indicated by the gravity vector data De from the acceleration vector indicated by the acceleration vector data Dd, and updates the difference vector data Df using the difference vector.

Next, the CPU 10 determines whether or not the magnitude of X-axis and Y-axis components of the difference vector, from which the Z-axis component is excluded, is equal to or more than a predetermined value (step 106). When the magnitude of the X-axis and Y-axis components of the difference vector is equal to or larger than the predetermined value, the CPU 10 advances the processing to step 107 subsequently. On the other hand, when the magnitude of the X-axis and Y-axis components of the difference vector is smaller than the predetermined value, the CPU 10 ends the processing of the subroutine.

In step 107, the CPU 10 determines that the controller 7 only has been swung, and starts counting the elapsed time after the determination. The CPU 10 then advances the processing to the subsequent step.

Next, the CPU 10 converts the difference vector at the current time point into a movement vector in the virtual game world (step 108), and advances the processing to the subsequent step. For example, the CPU 10 refers to the difference vector data Df, converts the difference vector indicated by the difference vector data Df into the movement vector, and updates the movement vector data Dg using the movement vector. Since the processes in above step 105 to step 108 are the same as the processes in step 55 to step 58, detailed description therefor will be omitted.

Next, the CPU 10 determines whether or not the direction of the movement vector calculated in step 108 is opposite to the game progressing direction (step 109). For example, as shown in FIG. 16B, suppose a case where the game progressing direction is an X-axis negative direction. In this case, the CPU 10 determines that the movement vector is opposite to the game progressing direction when the X-axis component of the movement vector calculated in step 108 is in the X-axis positive direction. When the direction of the movement vector is opposite to the game progressing direction, the CPU 10 advances the processing to step 110 subsequently. On the other hand, when the direction of the movement vector corresponds to the game progressing direction, the CPU 10 advances the processing to step 111 subsequently.

In step 110, the CPU 10 inverts the direction of the movement vector calculated in step 108, and then advances the processing to step 111 subsequently. For example, the CPU 10 refers to the movement vector data Dg, and inverts a positive/negative profile of each of the X-axis component and the Y-axis component of the movement vector indicated by the movement vector data Dg so as to invert the direction of the movement vector, thereby updating the movement vector data Dg while using the inverted movement vector. As shown in FIGS. 8 and 9, the present embodiment describes the game in which a player object OBJ is caused to move in the virtual game world in accordance with the direction in which the game controller 7 only is swung, and to proceed in the game progressing direction. Therefore, the player does not swing the controller 7 only in the direction opposite to the game progressing direction in the virtual game world, and thus when the movement vector opposite to the game progressing direction is obtained, the opposite vector is highly likely to be a back swing operation performed by the player prior to swinging the controller 7 only. In this case, the controller 7 only is swung immediately after the back swing, and the back swing is assumed to be precisely opposite to the swing direction to be performed immediately thereafter. Therefore, in another embodiment, if the player object is movable in any direction, such inversion performed in step 110 is not necessary.

Here, in the process of calculating the moving direction based on the difficulty level A in above-described step 43, the process of inversing the direction of the movement vector, as performed in above-described step 109 and step 110, is not performed. This is because the attitude of the unit-equipped controller 6 is relatively accurately calculated based on the angular velocity data and the acceleration data, and because it is possible to determine whether the obtained movement vector corresponds to a back swing performed immediately before swinging the unit-equipped controller 6, or corresponds to swinging of the unit-equipped controller 6 in an opposite direction performed by the player. Therefore, when the unit-equipped controller 6 having the angular velocity detection unit 9 mounted thereto is operated by the player, the player object OBJ can be moved in a direction opposite to the game progressing direction in the virtual game world in accordance with the direction in which the unit-equipped controller 6 is swung. On the other hand, when the angular velocity detection unit 9 is not mounted, and the controller 7 only is operated by the player, even if the direction in which the controller 7 only is swung is opposite to the game progressing direction in the virtual game world, the player object OBJ moves in the game progressing direction. In this manner, depending on whether or not the angular velocity detection unit 9 is mounted to the controller 7 operated by the player, the direction in which the player object PO is caused to move may differ even if the controller 7 and the unit-equipped controller 6 are swung in a common direction. As a result, the difficulty level of a game will be changed.

In step 111, the CPU 10 determines whether or not the player object OBJ is movable. For example, when the player object OBJ is in a stopped state for the sake of representation effect in the game processing, the CPU 10 determines that the player object OBJ is not in a movable state. When the player object OBJ is in a movable state, the CPU 10 advances the processing to step 112 subsequently. On the other hand, when the player object OBJ is not in a movable state, the CPU 10 ends the processing of the subroutine.

In step 112, the CPU 10 performs a process of correcting the direction of the movement vector (moving direction), and ends the processing of the subroutine. With reference to FIG. 15, an operation of the moving direction correction process performed in step 112 will be described.

In FIG. 15, the CPU 10 determines whether or not there is any correction target TG in the display on the monitor 2 (step 120). When there is any correction target TG in the display screen, the CPU 10 advances the processing to step 121 subsequently. On the other hand, when there is no correction target TG in the display screen, the CPU 10 advances the processing to step 129 subsequently.

In step 121, the CPU 10 sets a processing order with respect to the one or more correction targets TG displayed in the display screen, and advances the processing to the subsequent step. For example, the CPU 10 extracts a priority level which is indicated by the priority data Dh1 and is assigned to each of the correction targets TG displayed in the display screen, and determines the processing order of the correction targets TG in accordance with the priority level. The priority level of the correction targets TG is determined, for example, based on types of the correction targets TG. For example, from the viewpoint of game rules, a more important target than other targets will have a higher priority level, and thus is highly likely to be a target of processing. Alternatively, such a more important target than other target may be given a lower priority level such that the more important target is not likely to be the target of processing.

In step 121, the processing order may be determined in accordance with a distance between the correction target TG and the player object OBJ with reference to the correction target position data Dh2 and the player object position data Di, while being taken the above-described priority level into consideration. For example, when correction targets TG have the same priority level, such a correction target TG that is relatively closer in distance to the player object OBJ is given a priority processing order. In another example, the processing order may be set such that such a correction target TG that is relatively closer in distance to the player object OBJ is given the priority processing order. In this case, when correction targets TG are at the same distance from the player object OBJ, such a correction target TG that has a higher priority level is given the priority processing order.

Next, the CPU 10 selects the correction target TG in order of the processing order (step 122) determined in step 121. The CPU 10 refers to the correction target position data Dh2 of the selected correction target TG and the player object position data Di, and determines whether or not the correction target TG selected in step 122 is in the game progressing direction ahead of the player object OBJ (step 123). When the correction target TG is in the game progressing direction ahead of the player object OBJ, the CPU 10 advances the processing to step 124 subsequently. On the other hand, when the correction target TG is not in the game progressing direction ahead of the player object OBJ, the CPU 10 advances the processing to step 128 subsequently.

In step 124, the point P0 is calculated with respect to the selected correction target TG. The CPU 10 determines whether or not the distance a between the point P0 and the center of the correction target TG is less than half (Ro/2) of the range length Ro of the guiding source range of the selected correction target TG (step 125). In the case of a<Ro/2, the CPU 10 advances the processing to step 126 subsequently. On the other hand, in the case of a≦Ro/2, the CPU 10 advances the processing to step 128 subsequently.

As described with reference to FIG. 10A, the point P0 is obtained as an intersection between a direction (straight line L) perpendicular to a direction extending from the player object OBJ toward the correction target TG, and a direction of the movement vector (moving direction). The distance a from the point P0 to the center of the correction target G is compared with the half of the range length Ro of the guiding source range, whereby it is determined whether or not the moving direction, which is currently set and extends from a position of the player object OBJ at a current time point, passes within the guiding source range of the correction target TG. That is, it is determined that whether or not the selected correction target TG is to be a target of a correction process. In step 124 and step 125, the CPU 10 performs the above-described determination with reference to the movement vector data Dg, the player object position data Di, and the correction target position data Dh2 and the guiding source range data Dh3 of the selected correction target TG.

In step 126, in the case of a<Ro/2, that is, in the case where the selected correction target TG is the target of the correction process, the CPU 10 calculates the point P1 with respect to the correction target TG. The CPU 10 corrects the moving direction so as to be directed to the calculated point P1 (step 127), and then advances the processing to step 129 subsequently.

As described with reference to FIG. 10B, the point P1 is set along the straight line L so as to be distanced from the center of the correction target TG by distance b (=a*Rt/Ro) on the side of the point P0. Accordingly, the moving direction is corrected so as to be closer to the selected correction target TG at a rate of Pt/Ro. In step 126 and step 127, the CPU 10 performs such calculation with reference to the player object position data Di, and the correction target position data Dh2, the guiding source range data Dh3 and the guiding destination range data Dh4 of the selected correction target TG. The CPU 10 then refers to the movement vector data Dg, changes the direction of the movement vector indicated by the movement vector data Dg to the corrected moving direction, and then updates the movement vector data Dg using the changed movement vector.

On the other hand, in step 128, the CPU 10 determines whether or not there is any correction targets TG yet to be processed, among the correction targets TG with respect to which the processing order is set in step 121. When there is no correction target TG yet to be processed, the CPU 10 advances the processing to step 129 subsequently. On the other hand, when there is any correction target TG yet to be processed, the CPU 10 returns to step 122, and repeats the processing.

In step 129, the CPU 10 determines the movement vector indicated by the movement vector data Dg at the current time point as the movement vector to be used in the game process thereafter, and ends the processing of the subroutine.

With reference back to FIG. 12, after the process of calculating the moving direction based on the difficulty level A in step 43, or the process of calculating the moving direction based on the difficulty level B the step 44, the CPU 10 performs the game process (step 45), and performs a display process (step 46) to display, on the monitor 2, a game image corresponding to the game process, to advance the process to the subsequent step. For example, in step 45, the CPU 10 causes the player object OBJ in the virtual game world to move in accordance with the movement vector set in step 43 or in step 44. Further, when the player object OBJ has contact with another object or the like in the virtual game world, the CPU 10 performs a process in response to the object (e.g., a process to destroy the object, or a process to cause the player object OBJ to bounce off the object). Further, the CPU 10 also performs another game process that is not related to movement of the player object OBJ.

The movement vector indicated by the movement vector data Dg may be changed in accordance with details of the game process after the game process in step 45. For example, after the game process in step 45, the movement vector may be reduced at a predetermined rate. Alternatively, the direction of the movement vector may be changed when the player object OBJ has contact with another object in accordance with the above-described game process. When the movement vector is changed after the game process in step 45, the CPU 10 updates the movement vector data Dg using the changed movement vector.

Next, the CPU 10 determines whether or not to terminate the game (step 47). The game may be terminated, for example, when a condition for game over is satisfied, or when the player performs an operation to terminate the game. When the game is not terminated, the CPU 10 returns to step 42 and repeats the processing, whereas when the game is to be terminated, the processing in the flowchart ends.

According to the above-described game process, when the player operates the controller 7 only, the moving direction of the player object OBJ is corrected such that the player object OBJ, moving in accordance with the direction in which the controller 7 only is swung, becomes closer to the correction target TG. On the other hand, when the player operates the unit-equipped controller 6 having the angular velocity detection unit 9 mounted thereto, the moving direction is set without the above-described correction being performed. That is, when a case where the game process is performed by using the angular velocities detected by the angular velocity sensors provided to the input device is compared with a case where the game process is performed without using the angular velocities, the difficulty level of the game is different between the cases. Specifically, in the case where the game process is performed by using the angular velocities detected by the angular velocity sensors provided to the input device, the direction in which the input device is swung is recognized relatively accurately. Thus, the moving direction obtained from the swing direction is used as it is without being corrected, whereby the game process is performed while the difficulty level is set relatively high. On the other hand, in the case where the game process is performed without using the angular velocities for the reason that the angular velocity sensors are not provided to the input device or for any other reason, the direction in which the input device is swung is recognized relatively less accurately. Thus, the moving direction obtained from the swing direction is corrected such that the player object OBJ easily hits a correction target, whereby the game process is performed while the difficulty level is set low. In this manner, the difficulty level is changed depending on a mode for recognizing the motion of the input device operated by the player, whereby an operational difficulty level can be adjusted so as to be appropriate for the player.

In the above-described embodiment, the exemplary case has been described in which the difficulty level of a game is adjusted depending on whether or not the moving direction, obtained based on the direction in which the input device is swung, is corrected. However, the difficulty level may be adjusted by using another method. The present embodiment may be realized by using at least one of examples of adjusting the difficulty level described below, however, those are merely examples of the present embodiment in any way, and never limit the scope thereof. It is understood that various other modifications and variations can be devised without departing from the scope of the present embodiment.

As a first example, the moving direction, which is obtained based on the direction in which the input device is swung, is corrected by using an amount of correction (correction level) which varies depending on the mode for recognizing the motion of the input device operated by a player. For example, in the above-described game process, the size of a guiding source range and/or a guiding target range of the correction target TG is adjusted, whereby a level of correction of the moving direction can be adjusted. Specifically, the size of the guiding target range is adjusted with respect to the size of the correction target TG, whereby the level of correction is adjusted. Further, the size of the guiding source range is adjusted, whereby it is possible to adjust a probability that the correction target TG will be a target of the correction process, and to adjust the level of correction. In this manner, in the above-described game process, the size of the guiding target range (range length Rt) and/or the size of the guiding source range (range length Ro) are/is changed, whereby it is possible to adjust the level of correction and the probability that the correction target TG will be the target of the correction process. When the game process is performed by using the angular velocities detected by the angular velocity sensors provided to the input device, the level of correction and/or the probability are/is set relatively lower, whereby the game process is performed while the difficulty level is set relatively high. On the other hand, when the game process is performed without using the angular velocities for reason of no angular velocity sensors provided to the input device or for any other reason, the level of correction and/or the probability are/is set relatively higher, whereby the game process is performed while the difficulty level is set relatively low.

As a second example, depending on the mode for recognizing the motion of the input device operated by a player, the number of targets, among targets TG appearing in the virtual game world, which are to be subjected to correction of moving direction, is changed. That is, the frequency of correction is changed. For example, when the game process is performed without using the angular velocities for the reason of no angular velocity sensors provided to the input device or for any other reason, all the targets TG displayed on the monitor 2 are set as the targets to be subjected to the correction of moving direction. Accordingly, the game process is performed while the difficulty level is set relatively low. On the other hand, when the game process is performed by using the angular velocities detected by the angular velocity sensors provided to the input device, only some of the targets TG (e.g., such targets TG that play important roles in the game process), among the targets TG displayed on the monitor 2, are set as the targets to be subjected to the correction of moving direction, whereby the game process is performed while the difficulty level is set relatively high.

As a third example, depending on the mode for recognizing the motion of the input device operated by the player, a range in which the moving direction is set is limited. For example, as described above, when the game process is performed by using the angular velocities detected by the angular velocity sensors provided to the input device, the player object OBJ is set to move in a direction opposite to the game progressing direction in the virtual game world, in accordance with the direction in which the input device is swung. Accordingly, the game process is performed while the difficulty level is set relatively high. On the other hand, when the game process is performed without using the angular velocities for the reason of no angular velocity sensors provided to the input device or for any other reason, the player object OBJ is caused to move in the game progressing direction even if the direction in which the input device is swung is opposite to the game progressing direction in the virtual game world. Accordingly, the game process is performed while the difficulty level is set relatively low.

As a fourth example, depending on the mode for recognizing the motion of the input device operated by a player, a score obtained during a game is changed. For example, when the game process is performed without using the angular velocity for the reason of no angular velocity sensors provided to the input device or for any other reason, the game is set such that a relatively high score is obtained when the player object OBJ hits a certain target TG. Accordingly, the game process is performed while the difficulty level is set relatively low. On the other hand, when the game process is performed by using the angular velocities detected by the angular velocity sensors provided to the input device, the game is set such that a relatively low score is obtained even when the player object OBJ hits the same target TG as above described. Accordingly, the game process is performed while the difficulty level is set relatively high.

As a fifth example, depending on the mode for recognizing the motion of the input device operated by a player, a clear condition set for clearing a game stage is changed. For example, in a game in which the game progresses if an enemy character appearing in the virtual game world is beaten, when the game process is performed without using the angular velocities for the reason of no angular velocity sensors provided to the input device or for any other reason, the bearing force of the enemy character is set relatively lower. Accordingly, the game process is performed while the difficulty level is set relatively low. On the other hand, when the game process is performed by using the angular velocities detected by the angular velocity sensors provided to the input device, the bearing force of the enemy character is set relatively higher. Accordingly, the game process is performed while the difficulty level is set relatively high.

Figure 17A:
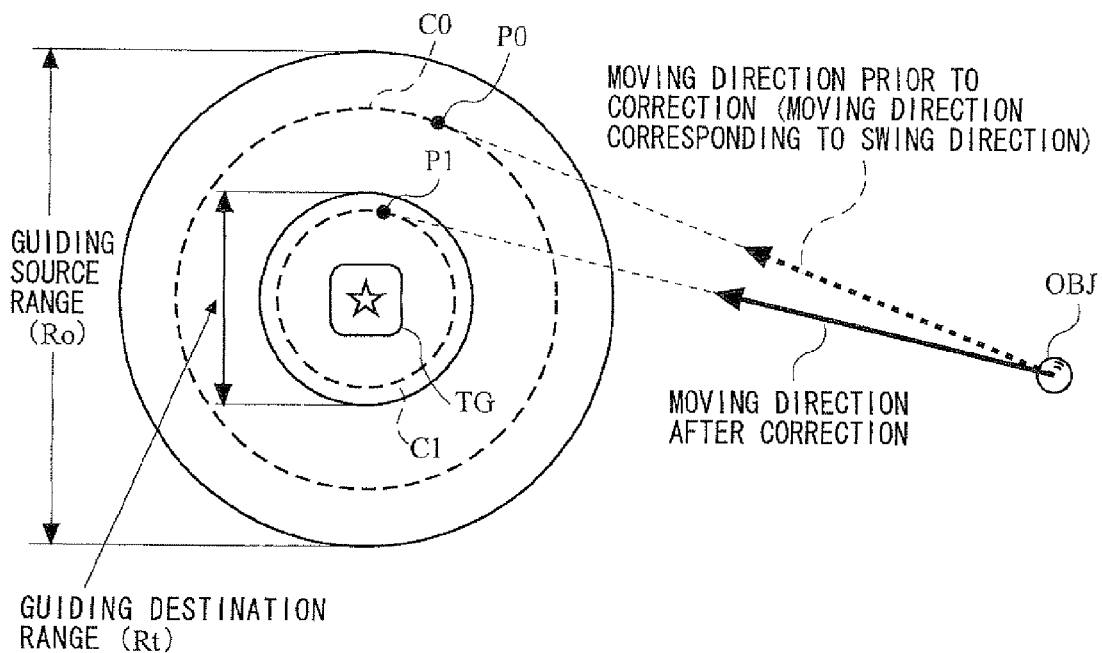
FIG. 17A is a diagram showing another example in which the moving direction set based on the swinging motion of the controller 7 only is corrected.
Figure 17B:
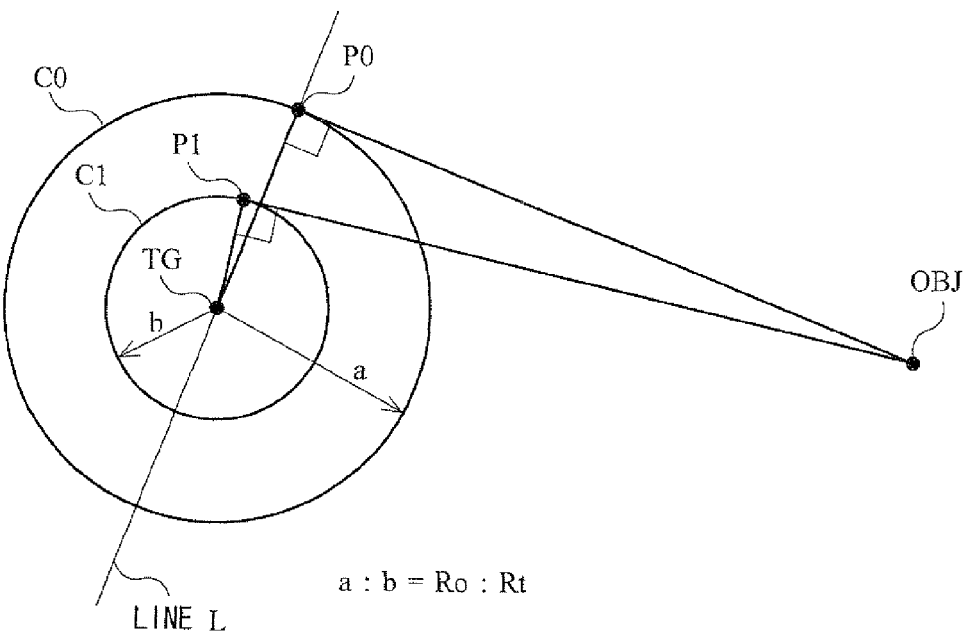
FIG. 17B is diagram showing another example in which the moving direction set based on the swinging motion of the controller 7 only is corrected.

The guiding source range and the guiding destination range of the correction target TG may be set in other forms. Hereinafter, with reference to FIGS. 17A and 17B, an example will be described where the guiding source range and the guiding destination range are set in other forms. FIGS. 17A and 17B are diagrams each showing an exemplary guiding source range and an exemplary guiding destination range of a correction target TG, which are circular-shaped.

In FIG. 17A and FIG. 17B, the circular-shaped guiding source range and the circular-shaped guiding destination range are set with respect to the correction target TG. The guiding source range is a circle centered on the correction target TG and has a diameter Ro. By using the guiding source range, whether or not a moving direction of a player object OBJ is to be corrected is determined. The moving direction is set in the virtual game world in accordance with the direction in which the controller 7 only is swung. Specifically, when the set moving direction extends from a position of the player object OBJ at a current time point and passes through at least a part of the guiding source range, the correction target TG which defines the guiding source range is set as a target of the correction process.

The guiding destination range is a circle centered on the correction target TG and has a diameter t (Rt<Ro). The guiding destination range is used to determine a level of correction of the moving direction of the player object OBJ so as to be closer to the correction target TG. For example, the moving direction, which is set as a target of the correction process, is corrected so as to be closer to the correction target TG in accordance with a ratio of a diameter of the guiding destination range to a diameter of the guiding source range.

Specifically, a circle which is centered on the correction target TG and is tangent to the moving direction prior to correction is set as a circle C0. A radius of the circle C0 is defined as a radius a (a<Ro/2). A contact point between the moving direction prior to correction and the circle C0 is P0. In this case, in accordance with the radius a, a circle C1 is sets which is centered on the correction target TG and has a radius b. The radius b is calculated based on an equation, b=a*Rt/Ro. The moving direction prior to correction which extends from the position of the player object OBJ at the current time point and is tangent to the circle C0 is corrected so as to extend from the position of the player object OBJ at the current time point toward a direction tangent to the circle C1. When the contact point between the moving direction after correction and the circle C1 is defined as P1, the contact point P1 is set on the side of the contact point P0 from the correction target TG.

The guiding source range and/or the guiding destination range may be changed in accordance with a game situation. As a first example, the size of the guiding source range and/or the guiding destination range is changed in accordance with the position of the correction target TG relative to the display screen on the monitor 2. For example, when the correction target TG is scrolled in a direction opposite to the game progressing direction, the guiding source range of the correction target TG is gradually enlarged in accordance with the scrolling movement. Accordingly, when the correction target TG is located on an upper side or a lower side of the player object OBJ, and is not easily hit by the player object OBJ, it will be easy to guide the player object OBJ to the correction target TG. The size of the guiding source range and/or the guiding target range is changed only when the game process is performed without using the angular velocities for the reason of no angular velocity sensors provided to the input device or for any other reason, whereby it is possible to achieve adjustment of the difficulty level of the game depending on the mode for recognizing the motion of the input device operated by the player.

As a second example, the size of the guiding source range and/or the guiding destination range is changed with time. For example, the guiding destination range of the correction target TG is gradually reduced. In this manner, the guiding destination range of the correction target TG is changed, whereby the player object OBJ, which cannot easily hit the correction target TG at the start of the game, comes to easily hit the correction target TG with time.

As a third example, the size of the guiding source range and/or the guiding destination range is changed in accordance with a game difficulty level. For example, in the case of a skilled game player or a game stage of a highly difficult level, the guiding source range is reduced relatively, or the guiding destination range is enlarged relatively. Accordingly, in the case of the skilled game player or the game stage of the highly difficult level, it is possible to create a situation where the player object OBJ cannot easily hit the correction target TG. The change in the size of the guiding source range and/or the guiding target range described in the above first to third examples may be applied only to the case where the game process is performed without using the angular velocities for the reason of no angular velocity sensors provided to the input device or for any other reason. In this manner, based on the change in the size of the guiding source range and/or the guiding target range described in the above first to third examples, it is possible to achieve the adjustment of the difficulty level of a game depending on the mode for recognizing the motion of the input device operated by a player.

For setting the processing order in step 121, the distance a (distance from the point P0 to the center of the correction target TG) may be used while the above-described priority is taken into consideration. For example, in step 121 the distance a is calculated for all the correction targets TG displayed in the display monitor, and the processing order is set such that a correction target TG that has a relatively short distance a is given a priority processing order. When a plurality of the correction targets TG has the same length of distance a, a correction target TG having the above-described higher priority is given a priority processing order.

Further, in the above-described examples, the case where the unit-equipped controller 6, that is, the controller 7 having the angular velocity detection unit 9 mounted thereto, is operated, has been distinguished from the case where the controller 7 only is operated, whereby the difficulty level of the game is adjusted. However, the difficulty level of the game may be adjusted depending on whether or not the angular velocities are used in the game process. For example, even if the unit-equipped controller 6, that is, the controller 7 having the angular velocity detection unit 9 mounted thereto, is to be operated, a player controlling the unit-equipped controller 6 selects whether or not to use the angular velocities for the game process, whereby the difficulty level may be adjusted based on a result of the selection. Specifically, when a player selects to use the angular velocities for the game process, the difficulty level of a game is set relatively high, whereas when the player selects not to use the angular velocities for the game process, the difficulty level is set relatively low. As another example, even if the unit-equipped controller 6, i.e., the controller 7 having the angular velocity detection unit 9 mounted thereto is to be operated, when the angular velocities obtained from the angular velocity detection unit 9 is determined to be inaccurate, the game process is performed without using the angular velocities, and the difficulty level of the game is set relatively low.

In the above-description, the input device is configured such that the angular velocity detection unit 9 detecting the angular velocities is detachable from the input device. However, an input device having another configuration may be applied to the present invention. For example, the input device may have a configuration in which a gyro sensor detecting angular velocities applied the controller 7 is mounted inside the controller 7, and a unit equipped with an acceleration sensor detecting acceleration is detachably attached to the controller 7. In this case, the difficulty level of a game is adjusted depending on the manner of using the angular velocity data and/or the acceleration data that can be outputted from the input device. For example, when a player selects to use both of the angular velocity data and the acceleration data for a game process, the difficulty level of the game is set relatively high, whereas when the player selects to use the acceleration data only for the game process, the difficulty level of the game is set relatively low.

Further, the above-described game process is based on the assumption that an operation is made by a single player, however, it is understood that the present invention can be realized by operations by a plurality of players. For example, suppose a case where a plurality of players play a game and operate different player objects P0, respectively, in a single virtual game world. Also suppose a case where some of the plurality of players play the game by operating the unit-equipped controllers 6, i.e., the controllers 7 having the angular velocity detection units 9 mounted thereto, whereas the remaining players play the game by operating the controllers 7 only. In this case, for player objects P0 operated by motions of the unit-equipped controllers 6, the difficulty level of the game is set relatively low at the time of adjusting the difficulty level. On the other hand, for player objects PO operated by motions of the controllers 7 only, the difficulty level of the game is set relatively high at the time of adjusting the difficulty level. For example, the moving direction of a player object PO operated by a motion of the unit-equipped controller 6 is calculated based on the difficulty level A (that is, the moving direction correction process in step 112 is not to be performed), whereas the moving direction of a player object PO operated by a motion of the controller 7 only is calculated based on the difficulty level B (that is, the moving direction correction process in step 112 is to be performed). In this manner, in the present invention, even if a plurality of players simultaneously play a game in the same virtual game world, the difficulty level is set to vary depending on the mode for recognizing the motion of the input device operated by each of the players. Accordingly, it is possible to appropriately adjust an operational difficulty level for each of the players.

Further, in the above-described game process, the acceleration data indicative of acceleration in three axis directions obtained from the acceleration sensor 701 is used. However, acceleration data indicative of acceleration in two axis directions may be used, alternatively. In this case, it is impossible to analyze acceleration exerting in a direction perpendicular to the two axis directions (e.g., the Z-axis direction). However, since the acceleration in a direction in which the centrifugal force is exerted during the game process is eliminated, it is possible to perform a similar process even if the acceleration data of the acceleration in the two axis directions (e.g., the X-axis direction and the Y-axis direction) only is used.

The above-described game is such that the player object OBJ in the two-dimensional virtual game world moves to the right and left in accordance with the direction in which the unit-equipped controller 6 or the controller 7 only is swung. However, it is understood that the present invention can be applied to a game in another form. As a first example, the present invention may be applied to a game in which a player object moves up and down in a two dimensional virtual game world in which a correction target is allocated. In this case, when a player swings the unit-equipped controller 6 or the controller 7 only up and down, the player object moves up and down in the virtual game world, whereby the moving direction of the player object is corrected based on a correction target allocated therein when the controller 7 only is operated.

As a second example, the present invention may be applicable to a game in which a player object moves in a depth direction of a virtual game world which is displayed on the monitor 2 and which has a correction target allocated therein. In this case, a player holds and moves the unit-equipped controller 6 or the controller 7 only as if the player gives a thrust. With acceleration occurred in accordance with the thrusting behavior, a player object is caused to move in the depth direction, and a moving direction of the player object is corrected in accordance with the correction target allocated, when the controller 7 only is operated, in the virtual game world.

As a third example, the present invention may be applicable to a game in which a player object is caused to move in a three-dimensional virtual game space in accordance with the unit-equipped controller 6 or the controller 7 only moving up and down, right and left, or back and forth. In this case, the acceleration component in the Z-axis direction which is applied to the unit-equipped controller 6 or the controller 7 only is not eliminated from the acceleration indicated by the acceleration data in the three axis directions which is obtained from the acceleration sensor 701, but the acceleration in all the three axis directions is used, and the direction and the magnitude of the acceleration is reflected in the three-dimensional virtual game space. Accordingly, the moving direction of the player object is corrected in accordance with the correction target allocated in the space when the controller 7 only is operated.

In the above description, the movement of the unit-equipped controller 6 or the controller 7 only is detected by using the acceleration indicated by the acceleration data in the three axis directions obtained from the acceleration sensor 701. However, when the unit-equipped controller 6, i.e., the controller 7 having the angular velocity detection unit 9 mounted thereto is operated, the motion (e.g., swing direction or swing speed) of the unit-equipped controller 6 may be detected by using the angular velocity data outputted from the angular velocity detection unit 9.

Further, the movement of the unit-equipped controller 6 or the controller 7 only may be detected by using data outputted from a sensor of another type mounted in the controller 7. For example, a sensor (an acceleration sensor, a tilt sensor) which outputs data corresponding to a tilt of the controller 7 relative to the direction of gravity (hereinafter simply referred to as "tilt"), a sensor (a magnetic sensor) which outputs data corresponding to an azimuth orientation of the controller 7, or a sensor (a gyro sensor) which outputs data corresponding to rotational movement of the controller 7 may be applicable. Further, the acceleration sensor and the gyro sensor need not be necessarily multi-axis detectable, but may be single-axis detectable. Further, some of the sensors may be combined to perform a further accurate motion detection. Alternatively, a camera mounted in the controller 7 (e.g., the imaging information calculation section 74) may be used as the sensor. In this case, an image captured by the camera changes in accordance with movement of controller 7, and thus it is possible to determine the movement of the controller 7 by analyzing the image.

The sensor may be, in some cases, arranged independently of the unit-equipped controller 6 or the controller 7. For example, an entirety of the unit-equipped controller 6 or the controller 7 is captured by the sensor, which is situated outside the unit-equipped controller 6 or the controller 7 and is used as a camera, and an image of the unit-equipped controller 6 or the controller 7 in the captured image is analyzed, whereby it is possible to determine the movement of the unit-equipped controller 6 or the controller 7. Further, a system may be applicable in which a unit mounted in the unit-equipped controller 6 or the controller 7 and a unit arranged independently of the unit-equipped controller 6 or the controller 7 are used in a combined manner. For example, a light emitting unit is arranged independently of the unit-equipped controller 6 or the controller 7, and a camera mounted in the unit-equipped controller 6 or the controller 7 captures light from the light emitting unit. The image captured by the camera is analyzed, whereby it is possible to determine the movement of the unit-equipped controller 6 or the controller 7. Alternatively, a system may be used in which a magnetic field generation device is arranged independently of the unit-equipped controller 6 or the controller 7, and a magnetic sensor is mounted in the unit-equipped controller 6 or the controller 7.

In the above description, a case has been exemplified where a stationary game apparatus is applied to the present invention. However, the present invention can be realized with an information processing device such as a commonly used personal computer, which is operated with an input device detachably mounted thereto an angular velocity sensor. For example, the attitude of the input device is calculated by an information processing unit in accordance with angular velocity data outputted from the angular velocity sensor mounted to the input device. Accordingly, various game processes can be performed by changing the difficulty level depending on whether or not to use the angular velocities applied to the input device.

The case has been described above where the controller 7 and the game apparatus body 5 are connected via wireless communication. However, the controller 7 may be electrically connected to the game apparatus body 5 via a cable. In this case, the cable connected to the controller 7 is connected to a connection terminal of the game apparatus body 5.

Further, the shape of the above-described controller 7 and the angular velocity detection unit 9, and the shapes, numbers, and installed positions of the operation sections 72 are merely examples, and the present invention can be realized with other shapes, numbers and installed positions. Further, the coefficients, determination values, formulas, processing orders or the like used in the above-described processing are merely example, and the present invention can be realized with other values, formulas, or processing orders.

The game program according to the present invention may be provided to the game apparatus body 5 not only through an external storage medium such as the optical disc 4, but also through a wired or a wireless communication line. Further, the game program may be stored in advance on a non-volatile storage device provided inside the game apparatus body 5. As an information storage medium storing the game program, a non-volatile semiconductor memory may be used instead of an optical disc-shaped storage medium including a CD-ROM, a DVD, and the like.

The game apparatus and the storage medium having stored thereon the game program according to the present embodiment are capable of appropriately setting an operational difficulty level in accordance with the mode for recognizing the motion of the input device, in a game played in accordance with an operation of moving the input device, and may be useful as a game apparatus and a game program for executing a game which progresses in accordance with an operation of moving the input device.

While the example embodiments presented herein have been described in detail, the foregoing description is in all aspects illustrative and not restrictive. It is understood that numerous other modifications and variations can be devised without departing from the scope of the embodiments. It is should be understood that the scope of the present embodiments is interpreted only by the scope of the claims. It is also understood that, from the description of specific embodiments, the one skilled in the art can easily implement the present embodiment in the equivalent range based on the description of the present embodiment and on the common technological knowledge. It is understood that descriptions of patents, patent applications, and documents are specifically cited in the present specification, and that the descriptions thereof should be incorporated in the present specification by reference.

Further, throughout the specification, it is understood that terms in singular form should include a concept of plurality. Thus, it should be understood that articles or adjectives indicating the singular form (e.g., "a", "an", "the", and the like in English) includes the concept of plurality unless otherwise specified. Further it should be understood that terms used in the present specification have meanings generally used in the art concerned unless otherwise specified. Therefore, unless otherwise defined, all the jargons and technical terms have the same meanings as those generally understood by one skilled in the art of the present invention embodiment. In the event of any confliction, the present specification (including meanings defined herein) has priority.

What is claimed is:

1. A system for performing a game process in accordance with a motion applied to an input device provided with at least one of an acceleration sensor and an angular velocity sensor, the system comprising:
   an input device; and
   a processing system, including one or more computer processors, configured to:
      determine whether or not the input device is provided with the angular velocity sensor so that an angular velocity detected by the angular velocity sensor is to be used for the game process or not to be used for the game process, respectively, and determine, when the input device is provided with the angular velocity sensor, whether or not to use the angular velocity detected by the angular velocity sensor for the game process;
      set a difficulty level of a game to be subjected to the game process so as to vary depending on whether the processing system has determined to use the angular velocity or not to use the angular velocity;
      perform a process of specifying a motion direction of the input device by using acceleration detected by the acceleration sensor when the processing system has determined not to use the angular velocity, and perform at least a part of the process of specifying the motion direction of the input device by using the angular velocity detected by the angular velocity sensor when the processing system has determined to use the angular velocity; and
      perform the game process in accordance with the specified motion direction while the set difficulty level is applied.

2. A method for performing a game process in accordance with a motion applied to an input device provided with at least one of an acceleration sensor and an angular velocity sensor, the method comprising:

determining, via one or more computer processors, whether or not the input device is provided with the angular velocity sensor so that an angular velocity detected by the angular velocity sensor is to be used for the game process or not to be used for the game process, respectively, and for determining, when the input device is provided with the angular velocity sensor, whether or not to use the angular velocity detected by the angular velocity sensor for the game process;

setting, via one or more computer processors, a difficulty level of a game to be subjected to the game process so as to vary depending on whether the determining determines to use the angular velocity or the determining determines not to use the angular velocity;

specifying, via one or more computer processors, a motion direction for performing a process of specifying a motion direction of the input device by using acceleration detected by the acceleration sensor when the determining has determined not to use the angular velocity, and for performing at least a part of the process of specifying the motion direction of the input device by using the angular velocity detected by the angular velocity sensor when the determining has determined to use the angular velocity; and performing, via one or more computer processors, the game process in accordance with the motion direction specified by the motion direction specifying while the difficulty level set by the difficulty level setting is applied.

3. A game apparatus for performing a game process in accordance with a motion applied to an input device provided with at least one of an acceleration sensor and an angular velocity sensor, the game apparatus comprising:

a determination unit for determining whether or not the input device is provided with the angular velocity sensor so that an angular velocity detected by the angular velocity sensor is to be used for the game process or not to be used for the game process, respectively, and for determining, when the input device is provided with the angular velocity sensor, whether or not to use the angular velocity detected by the angular velocity sensor for the game process;

a difficulty level setting unit for setting a difficulty level of a game to be subjected to the game process so as to vary depending on whether the determination unit determines to use the angular velocity or the determination unit determines not to use the angular velocity;

a motion direction specifying unit for performing a process of specifying a motion direction of the input device by using acceleration detected by the acceleration sensor when the determination unit has determined not to use the angular velocity, and for performing at least a part of the process of specifying the motion direction of the input device by using the angular velocity detected by the angular velocity sensor when the determination unit has determined to use the angular velocity; and a game processing unit for performing the game process in accordance with the motion direction specified by the motion direction specifying unit while the difficulty level set by the difficulty level setting unit is applied.

4. The game apparatus according to claim 3, wherein the game processing unit sets a moving direction of a player object in a virtual game world in accordance with the motion direction specified by the motion direction specifying unit, and corrects the moving direction in accordance with the difficulty level, and causes the player object to move in the virtual game world, and the difficulty level setting unit sets a level of correction of the moving direction as the difficulty level.

5. The game apparatus according to claim 4, wherein the difficulty level setting unit sets the level of correction relatively higher when the determination unit has determined not to use the angular velocity than when the determination unit has determined to use the angular velocity.

6. The game apparatus according to claim 5, wherein the difficulty level setting unit sets the level of correction to 0 so as not to correct the moving direction when the determination unit has determined to use the angular velocity.

7. The game apparatus according to claim 4, wherein the game processing unit sets the moving direction to a direction, in the virtual game world, corresponding to the motion direction specified by the motion direction specifying unit, and corrects the moving direction when the moving direction points to and falls within a predetermined range, and the difficulty level setting unit sets the level of correction by changing the predetermined range.

8. The game apparatus according to claim 4, wherein the game processing unit sets the moving direction to a direction, in the virtual game world, corresponding to the motion direction specified by the motion direction specifying unit, and corrects the moving direction such that the moving direction points to and falls within a predetermined range, and the difficulty level setting unit sets the level of correction by changing the predetermined range.

9. The game apparatus according to claim 3, wherein the angular velocity sensor is detachably connected to the input device, the game apparatus further comprises a connection detection unit for detecting whether or not the angular velocity sensor is connected to the input device, and the determination unit determines to use the angular velocity detected by the angular velocity sensor for the game process when the connection detecting unit detects that the angular velocity sensor is connected to the input device.

10. The game apparatus according to claim 3, wherein the motion direction specifying unit calculates an attitude of the input device by using at least the angular velocity detected by the angular velocity sensor when the determination unit has determined to use the angular velocity, and calculates a direction of acceleration exerted on the input device by using the acceleration detected by the acceleration sensor, and specifies the motion direction of the input device in an actual space by using the attitude and the direction of the acceleration exerted.

11. The game apparatus according to claim 10, wherein the motion direction specifying unit includes an attitude correction unit for correcting the attitude of the input device, the attitude being calculated by using the angular velocity detected by the angular velocity sensor, by using the acceleration detected by the acceleration sensor, and the motion direction specifying unit specifies the motion direction of the input device by using the attitude of the input device, the attitude having been corrected by the attitude correction unit, and by using the direction of the acceleration exerted.

12. The game apparatus according to claim 3, wherein, when the determination unit has determined not to use the angular velocity, the motion direction specifying unit calculates an attitude of the input device and a direction of acceleration exerted on the input device by using the acceleration detected by the acceleration sensor, and specifies the motion direction of the input device in an actual space by using the attitude and the direction of the acceleration.

13. A non-transitory computer-readable storage medium having stored thereon a game program executed on a computer of a game apparatus performing a game process in accordance with a motion applied to an input device provided with at least one of an acceleration sensor and an angular velocity sensor, the computer being caused to at least perform:

determination for determining whether or not the input device is provided with the angular velocity sensor so that an angular velocity detected by the angular velocity sensor is to be used for the game process or not to be used for the game process, respectively, and for determining, when the input device is provided with the angular velocity sensor, whether or not to use the angular velocity detected by the angular velocity sensor for the game process;

difficulty level setting for setting a difficulty level of a game to be subjected to the game process so as to vary depending on whether the determination determines to use the angular velocity or the determination determines not to use the angular velocity;

motion direction specifying for performing a process of specifying a motion direction of the input device by using acceleration detected by the acceleration sensor when the determination has determined not to use the angular velocity, and for performing at least a part of the process of specifying the motion direction of the input device by using the angular velocity detected by the angular velocity sensor when the determination has determined to use the angular velocity; and game processing for performing the game process in accordance with the motion direction specified by the motion direction specifying while the difficulty level set by the difficulty level setting is applied.

14. The non-transitory computer-readable storage medium having stored thereon the game program according to claim 13, wherein the game processing sets a moving direction of a player object in a virtual game world in accordance with the motion direction specified by the motion direction specifying, and corrects the moving direction in accordance with the difficulty level, and causes the player object to move in the virtual game world, and the difficulty level setting sets a level of correction of the moving direction as the difficulty level.

15. The non-transitory computer-readable storage medium having stored thereon the game program according to claim 14, wherein the difficulty level setting sets the level of correction relatively higher when the determination has determined not to use the angular velocity than when the determination has determined to use the angular velocity.

16. The non-transitory computer-readable storage medium having stored thereon the game program according to claim 15, wherein the difficulty level setting sets the level of correction to 0 so as not to correct the moving direction when the determination has determined to use the angular velocity.

17. The non-transitory computer-readable storage medium having stored thereon the game program according to claim 14, wherein the game processing sets the moving direction to a direction, in the virtual game world, corresponding to the motion direction specified by the motion direction specifying, and corrects the moving direction when the moving direction points to and falls within a predetermined range, and the difficulty level setting sets the level of correction by changing the predetermined range.

18. The non-transitory computer-readable storage medium having stored thereon the game program according to claim 14, wherein the game processing sets the moving direction to a direction, in the virtual game world, corresponding to the motion direction specified by the motion direction specifying, and corrects the moving direction such that the moving direction points to and falls within a predetermined range, and the difficulty level setting sets the level of correction by changing the predetermined range.

19. The non-transitory computer-readable storage medium having stored thereon the game program according to claim 13, wherein the angular velocity sensor is detachably connected to the input device, the game program further causes the computer to perform connection detection for detecting whether or not the angular velocity sensor is connected to the input device, and the determination determines to use the angular velocity detected by the angular velocity sensor for the game process when the connection detecting detects that the angular velocity sensor is connected to the input device.

20. The non-transitory computer-readable storage medium having stored thereon the game program according to claim 13, wherein the motion direction specifying calculates an attitude of the input device by using at least the angular velocity detected by the angular velocity sensor when the determination has determined to use the angular velocity, and calculates a direction of acceleration exerted on the input device by using the acceleration detected by the acceleration sensor, and specifies the motion direction of the input device in an actual space by using the attitude and the direction of the acceleration exerted.

21. The non-transitory computer-readable storage medium having stored thereon the game program according to claim 20, wherein the motion direction specifying includes attitude correction for correcting the attitude of the input device, the attitude being calculated by using the angular velocity detected by the angular velocity sensor, by using the acceleration detected by the acceleration sensor, and the motion direction specifying specifies the motion direction of the input device by using the attitude of the input device, the attitude having been corrected by the attitude correction, and by using the direction of the acceleration exerted.

22. The non-transitory computer-readable storage medium having stored thereon the game program according to claim 13, wherein, when the determination has determined not to use the angular velocity, the motion direction specifying calculates an attitude of the input device and a direction of acceleration exerted on the input device by using the acceleration detected by the acceleration sensor, and specifies the motion direction of the input device in an actual space by using the attitude and the direction of the acceleration.

* * * * *